United States Patent
Garner et al.

(10) Patent No.: US 12,464,188 B1
(45) Date of Patent: Nov. 4, 2025

(54) INTELLIGENT AND ADJUSTABLE CONFIGURATION AND PRESENTATION OF MEDIA CONTENT

(71) Applicant: Roku, Inc., San Jose, CA (US)

(72) Inventors: Gregory Garner, Key Colony Beach, FL (US); Sunil Ramesh, Saratoga, CA (US); David Lee Stern, Los Gatos, CA (US); Michael Patrick Cutter, Golden, CO (US); Robert Caston Curtis, Napa, CA (US); Patrick Brouillette, Tempe, AZ (US); Philip Golyshko, Westminster, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/780,189

(22) Filed: Jul. 22, 2024

(51) Int. Cl.
*H04N 21/431* (2011.01)
*H04N 21/41* (2011.01)

(52) U.S. Cl.
CPC ..... *H04N 21/4316* (2013.01); *H04N 21/4126* (2013.01)

(58) Field of Classification Search
CPC .................. H04N 21/4126; H04N 21/4316
See application file for complete search history.

(56) References Cited

U.S. PATENT DOCUMENTS

| | | | | |
|---|---|---|---|---|
| 5,498,003 A | * | 3/1996 | Gechter | A63F 13/63 463/31 |
| 5,715,416 A | * | 2/1998 | Baker | G06F 16/10 715/744 |
| 5,838,314 A | * | 11/1998 | Neel | H04N 21/812 348/E7.071 |
| 5,872,575 A | * | 2/1999 | Segal | G06T 15/00 345/473 |
| 6,057,872 A | * | 5/2000 | Candelore | H04N 21/44222 348/E7.071 |
| 6,097,393 A | * | 8/2000 | Prouty, IV | G06F 3/04815 715/848 |
| 6,409,602 B1 | * | 6/2002 | Wiltshire | G07F 17/3288 463/16 |
| 6,766,524 B1 | * | 7/2004 | Matheny | G06Q 30/0241 725/23 |

(Continued)

*Primary Examiner* — Michael B. Pierorazio
(74) *Attorney, Agent, or Firm* — Straylight LLP

(57) ABSTRACT

System, apparatus, article of manufacture, method and/or computer program embodiments are provided for determining a presentation configuration of content. An example method can include determining information about primary content displayed on a first display and an environment of the first display, the information including a display configuration of the primary content, a characteristic of the primary content, and/or an indication whether a user is present in the environment and/or the environment includes a second display coupled to a client or a different client that is coupled to the client; based on the information, determining a different display configuration for displaying the secondary content; and based on the different display configuration, generating an instruction to display the secondary content at the second display or on an ROI at the first display, the ROI excluding the primary content or including a portion of the primary content having a saliency below a threshold.

20 Claims, 9 Drawing Sheets

(56) References Cited

U.S. PATENT DOCUMENTS

| | | | | |
|---|---|---|---|---|
| 7,000,242 B1* | 2/2006 | Haber | | G06Q 40/12 |
| | | | | 725/43 |
| 7,054,831 B2* | 5/2006 | Koenig | | A63F 13/61 |
| | | | | 463/16 |
| 7,071,041 B2* | 7/2006 | Yamazaki | | H10D 86/0221 |
| | | | | 257/E27.111 |
| 7,162,197 B2* | 1/2007 | Kitamura | | A63H 33/38 |
| | | | | 715/251 |
| 7,375,731 B2* | 5/2008 | Divakaran | | G06F 16/785 |
| | | | | 345/581 |
| 7,715,642 B1* | 5/2010 | Collins | | H04N 19/23 |
| | | | | 382/284 |
| 8,043,156 B2* | 10/2011 | Ackley | | A63F 13/79 |
| | | | | 463/31 |
| 8,090,799 B2* | 1/2012 | Keeler | | G06Q 30/02 |
| | | | | 709/218 |
| 8,221,220 B2* | 7/2012 | Ackley | | A63F 13/30 |
| | | | | 463/31 |
| 8,271,575 B2* | 9/2012 | Hunter | | H04L 12/66 |
| | | | | 725/38 |
| 8,424,034 B2* | 4/2013 | Bokor | | H04N 21/8586 |
| | | | | 725/32 |
| 8,429,015 B2* | 4/2013 | Do | | G06Q 30/02 |
| | | | | 705/14.55 |
| 8,713,603 B2* | 4/2014 | Kilar | | H04N 7/17318 |
| | | | | 725/32 |
| 10,524,006 B2* | 12/2019 | Benea | | H04N 21/44218 |
| 2001/0001160 A1* | 5/2001 | Shoff | | H04N 21/4312 |
| | | | | 725/108 |
| 2001/0037303 A1* | 11/2001 | Mizrahi | | H04N 21/816 |
| | | | | 348/E7.071 |
| 2001/0039571 A1* | 11/2001 | Atkinson | | H04N 21/4722 |
| | | | | 348/E7.071 |
| 2002/0033844 A1* | 3/2002 | Levy | | G06F 40/117 |
| | | | | 715/744 |
| 2002/0052746 A1* | 5/2002 | Handelman | | G10L 15/22 |
| | | | | 704/E15.045 |
| 2002/0069405 A1* | 6/2002 | Chapin | | H04N 21/47205 |
| | | | | 725/135 |
| 2002/0184098 A1* | 12/2002 | Giraud | | G06V 40/165 |
| | | | | 705/14.66 |
| 2002/0186867 A1* | 12/2002 | Gutta | | G06F 16/40 |
| | | | | 382/116 |
| 2003/0056212 A1* | 3/2003 | Siegel | | H04N 5/913 |
| | | | | 380/278 |
| 2003/0149618 A1* | 8/2003 | Sender | | G06Q 30/0277 |
| | | | | 705/26.1 |
| 2003/0149975 A1* | 8/2003 | Eldering | | H04N 21/4532 |
| | | | | 348/E7.071 |
| 2003/0192060 A1* | 10/2003 | Levy | | H04N 5/783 |
| | | | | 725/112 |
| 2003/0217210 A1* | 11/2003 | Carau, Sr. | | G06F 1/26 |
| | | | | 710/302 |
| 2004/0068536 A1* | 4/2004 | Demers | | H04L 69/329 |
| | | | | 709/201 |
| 2004/0255322 A1* | 12/2004 | Meadows | | H04N 21/2543 |
| | | | | 725/23 |
| 2005/0086069 A1* | 4/2005 | Watson | | H04N 21/4755 |
| | | | | 726/3 |
| 2005/0108751 A1* | 5/2005 | Dacosta | | H04N 21/4135 |
| | | | | 348/E5.103 |
| 2005/0132398 A1* | 6/2005 | Baran | | G06Q 30/04 |
| | | | | 348/E7.071 |
| 2005/0144024 A1* | 6/2005 | Wojton | | G06Q 50/10 |
| | | | | 705/319 |
| 2005/0267813 A1* | 12/2005 | Monday | | H04N 21/47 |
| | | | | 705/14.69 |
| 2006/0015925 A1* | 1/2006 | Logan | | H04N 21/84 |
| | | | | 348/E7.071 |
| 2006/0053342 A1* | 3/2006 | Bazakos | | G08B 13/19682 |
| | | | | 714/37 |
| 2006/0110136 A1* | 5/2006 | Abecassis | | H04N 21/47 |
| | | | | 348/E7.071 |
| 2006/0123451 A1* | 6/2006 | Preisman | | H04N 7/17318 |
| | | | | 348/E7.071 |
| 2006/0184579 A1* | 8/2006 | Mills | | H04N 21/4788 |
| 2006/0291483 A1* | 12/2006 | Sela | | H04L 69/08 |
| | | | | 370/401 |
| 2007/0106557 A1* | 5/2007 | Varghese | | G06Q 30/0217 |
| | | | | 705/14.69 |
| 2008/0002892 A1* | 1/2008 | Jelonek | | H04N 21/25891 |
| | | | | 707/E17.026 |
| 2008/0015864 A1* | 1/2008 | Ross | | G10L 15/1822 |
| | | | | 704/E15.044 |
| 2008/0089659 A1* | 4/2008 | Clapper | | G06F 16/40 |
| | | | | 386/248 |
| 2008/0115161 A1* | 5/2008 | Kurzion | | G06Q 30/02 |
| | | | | 725/62 |
| 2008/0115655 A1* | 5/2008 | Weng | | G10H 1/0008 |
| | | | | 84/609 |
| 2008/0134229 A1* | 6/2008 | Conant | | H04N 21/25875 |
| | | | | 348/E7.071 |
| 2008/0187279 A1* | 8/2008 | Gilley | | H04N 21/43615 |
| | | | | 386/250 |
| 2008/0221986 A1* | 9/2008 | Soicher | | G06Q 30/0277 |
| | | | | 705/14.56 |
| 2008/0282283 A1* | 11/2008 | Hilton | | H04N 21/47815 |
| | | | | 725/86 |
| 2008/0295129 A1* | 11/2008 | Laut | | H04N 21/812 |
| | | | | 725/34 |
| 2009/0116695 A1* | 5/2009 | Anchyshkin | | G06V 40/16 |
| | | | | 382/106 |
| 2009/0133051 A1* | 5/2009 | Hildreth | | H04N 21/42204 |
| | | | | 725/28 |
| 2009/0196464 A1* | 8/2009 | Dimitrova | | G06V 10/774 |
| | | | | 382/118 |
| 2009/0210902 A1* | 8/2009 | Slaney | | H04N 21/4223 |
| | | | | 725/34 |
| 2009/0217315 A1* | 8/2009 | Malik | | H04N 7/181 |
| | | | | 725/9 |
| 2009/0217316 A1* | 8/2009 | Gupta | | H04L 65/762 |
| | | | | 705/14.66 |
| 2009/0281908 A1* | 11/2009 | Wong | | H04N 21/2543 |
| | | | | 705/26.1 |
| 2009/0285454 A1* | 11/2009 | Xu | | H04N 21/44218 |
| | | | | 382/118 |
| 2009/0299752 A1* | 12/2009 | Rodriguez | | G06F 40/242 |
| | | | | 704/E15.001 |
| 2010/0007726 A1* | 1/2010 | Barbieri | | G06V 40/193 |
| | | | | 348/78 |
| 2010/0008547 A1* | 1/2010 | Yagnik | | G06F 18/28 |
| | | | | 382/118 |
| 2010/0067745 A1* | 3/2010 | Kovtun | | G06V 20/40 |
| | | | | 382/106 |
| 2010/0131385 A1* | 5/2010 | Harrang | | G06Q 30/0631 |
| | | | | 705/26.1 |
| 2010/0141787 A1* | 6/2010 | Bigioi | | G06V 40/161 |
| | | | | 348/222.1 |
| 2010/0162289 A1* | 6/2010 | Sanders | | H04N 21/812 |
| | | | | 725/23 |
| 2010/0256561 A1* | 10/2010 | Gillespie, Jr. | | G01B 7/003 |
| | | | | 604/151 |
| 2010/0283741 A1* | 11/2010 | Heintze | | G06F 3/0238 |
| | | | | 345/173 |
| 2010/0332570 A1* | 12/2010 | Roberts | | H04N 21/25866 |
| | | | | 707/957 |
| 2011/0052012 A1* | 3/2011 | Bambha | | G06V 40/16 |
| | | | | 382/118 |
| 2011/0129126 A1* | 6/2011 | Begeja | | G06F 16/784 |
| | | | | 382/118 |
| 2011/0137753 A1* | 6/2011 | Moehrle | | G06V 20/49 |
| | | | | 725/60 |
| 2011/0138326 A1* | 6/2011 | Roberts | | G06Q 30/0243 |
| | | | | 715/808 |
| 2011/0150295 A1* | 6/2011 | Eckhoff | | G06Q 30/02 |
| | | | | 382/118 |

(56) References Cited

U.S. PATENT DOCUMENTS

| | | | |
|---|---|---|---|
| 2011/0150296 A1* | 6/2011 | Eckhoff | G06Q 30/02 |
| | | | 382/118 |
| 2011/0150297 A1* | 6/2011 | Eckhoff | G06V 40/172 |
| | | | 382/118 |
| 2011/0150298 A1* | 6/2011 | Eckhoff | G06Q 30/02 |
| | | | 382/118 |
| 2011/0150299 A1* | 6/2011 | Eckhoff | G06Q 30/02 |
| | | | 382/118 |
| 2011/0231757 A1* | 9/2011 | Haddick | H04N 23/55 |
| | | | 715/702 |
| 2011/0276334 A1* | 11/2011 | Wang | G10H 1/361 |
| | | | 704/E21.001 |
| 2011/0310580 A1* | 12/2011 | Leung | G06F 3/04886 |
| | | | 361/807 |
| 2012/0016678 A1* | 1/2012 | Gruber | G06F 40/279 |
| | | | 704/E21.001 |
| 2012/0072936 A1* | 3/2012 | Small | G06Q 30/00 |
| | | | 725/10 |
| 2012/0084811 A1* | 4/2012 | Thompson | H04N 21/812 |
| | | | 725/34 |
| 2012/0110620 A1* | 5/2012 | Kilar | H04N 21/812 |
| | | | 725/34 |
| 2013/0036011 A1* | 2/2013 | Roberts | H04N 21/4223 |
| | | | 705/14.58 |
| 2020/0196014 A1* | 6/2020 | Shah | H04N 21/4532 |
| 2023/0254536 A1* | 8/2023 | Benea | H04N 21/6587 |
| | | | 725/12 |
| 2024/0348875 A1* | 10/2024 | Benea | G06V 40/168 |

\* cited by examiner

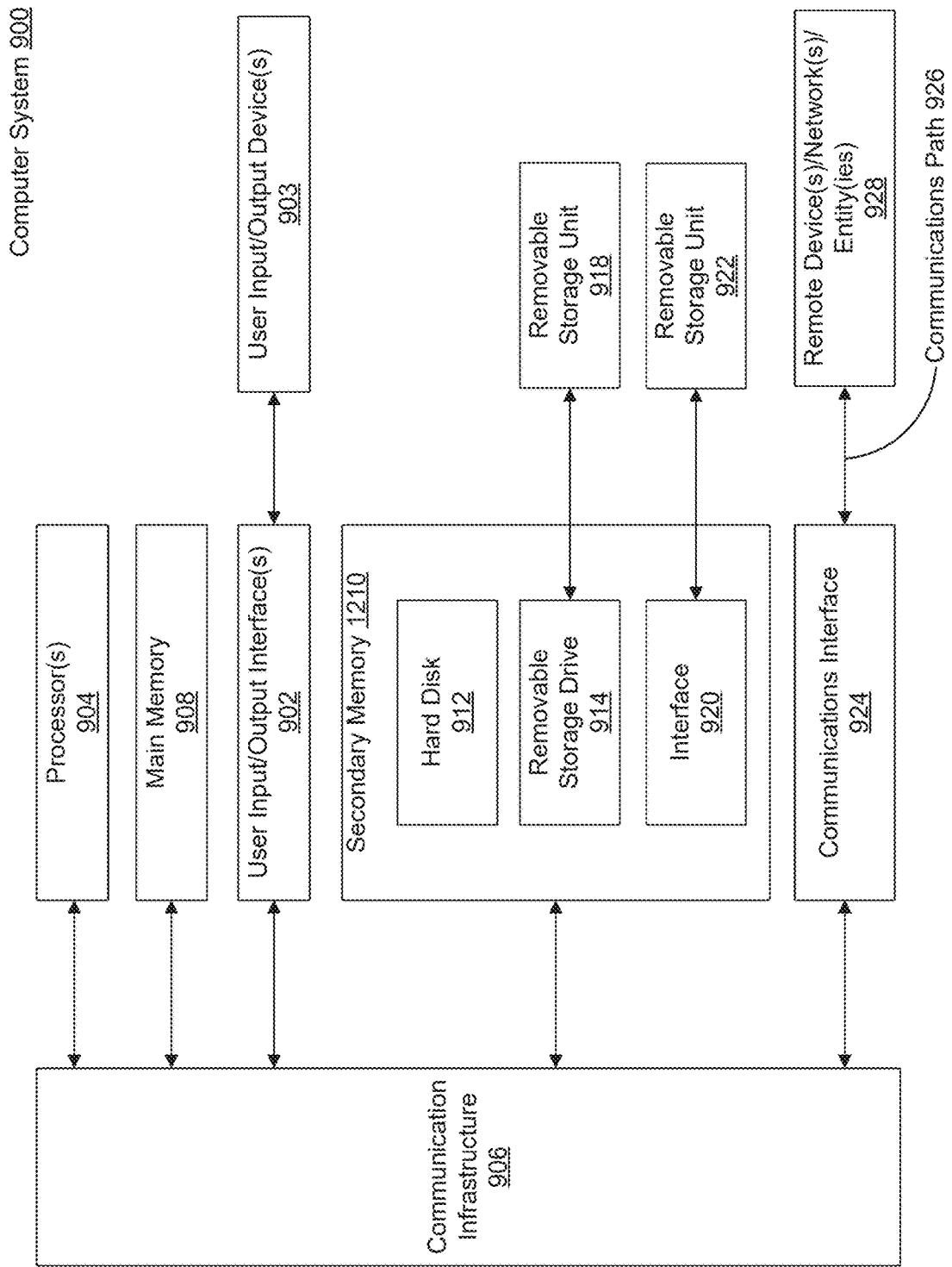

INTELLIGENT AND ADJUSTABLE CONFIGURATION AND PRESENTATION OF MEDIA CONTENT

BACKGROUND

Field

This disclosure is generally directed to selecting, configuring, and rendering different content during media content sessions and, more specifically, determining the type, placement and/or presentation settings of different content items during a media content session.

SUMMARY

Provided herein are system, apparatus, article of manufacture, method and/or computer program product embodiments (and/or combinations and/or sub-combinations thereof) for determining a configuration (e.g., a type, placement, presentation, etc.) of digital content presented to a user during a media content session or presentation that includes other digital content. In some aspects, a method is provided for determining a configuration of secondary content presented to a user during a session associated with primary content. An example method can include determining information about a first content item displayed on a first display device. The information about the first content item can include a first display configuration and/or a characteristic(s) of the first content item. The method can include determining information about an environment associated with the first display device. The information about the environment can indicate whether a user is present in the environment and/or whether the environment includes a second display device communicatively coupled to a first client device associated with the first display device or a second client device communicatively coupled to the first client device.

The method can also include determining, based on the information about the first content item and the information about the environment, a second content item to display for the user and a second display configuration for displaying the second content item to the user and, in response to determining the second content item and the second display configuration, generating an instruction to display the second content item on the second display device and/or a region-of-interest (ROI) on the first display device. The ROI can include a display region that does not include the first content item or includes a portion of the first content item that has an estimated saliency value that is below a threshold.

In some aspects, a system is provided for determining a configuration of secondary content presented to a user during a session associated with primary content. In some examples, the system can include a computing device(s), such as a server computer, a desktop computer, a set-top box, an Internet-of-Things (IoT) device, a peripheral device, a mobile device (e.g., a laptop computer, a tablet computer, a mobile phone or smartphone, etc.), a wearable computing device (e.g., a smartwatch, smartglasses, a head-mounted display (HMD), extended reality (e.g., virtual reality, augmented reality, mixed reality, virtual reality with video passthrough, etc.) glasses, etc.), a single-board computer (SBC) or system-on-chip (SoC) device, an edge device, a smart device (e.g., a smart television, a smart appliance, etc.), among others.

The system can include memory used to store data, such as computing instructions, and one or more processors coupled to the memory and configured to determine information about a first content item displayed on a first display device. The information about the first content item can include a first display configuration and/or a characteristic(s) of the first content item. The one or more processors can be further configured to determine information about an environment associated with the first display device. The information about the environment can indicate whether a user is present in the environment and/or whether the environment includes a second display device communicatively coupled to a first client device associated with the first display device or a second client device communicatively coupled to the first client device.

The one or more processors can be further configured to determine, based on the information about the first content item and the information about the environment, a second content item to display for the user and a second display configuration for displaying the second content item to the user and, in response to determining the second content item and the second display configuration, generating an instruction to display the second content item on the second display device and/or a region-of-interest (ROI) on the first display device. The ROI can include a display region that does not include the first content item or includes a portion of the first content item that has an estimated saliency value that is below a threshold.

In some aspects, a non-transitory computer-readable medium is provided for determining a configuration of secondary content presented to a user during a session associated with primary content. In some cases, the non-transitory computer-readable medium can have instructions stored thereon that, when executed by one or more processors, cause the one or more processors to determine information about a first content item displayed on a first display device. The information about the first content item can include a first display configuration and/or a characteristic(s) of the first content item. The instructions can further cause the one or more processors to determine information about an environment associated with the first display device. The information about the environment can indicate whether a user is present in the environment and/or whether the environment includes a second display device communicatively coupled to a first client device associated with the first display device or a second client device communicatively coupled to the first client device.

The instructions can also cause the one or more processors to determine, based on the information about the first content item and the information about the environment, a second content item to display for the user and a second display configuration for displaying the second content item to the user and, in response to determining the second content item and the second display configuration, generating an instruction to display the second content item on the second display device and/or a region-of-interest (ROI) on the first display device. The ROI can include a display region that does not include the first content item or includes a portion of the first content item that has an estimated saliency value that is below a threshold.

BRIEF DESCRIPTION OF THE FIGURES

The accompanying drawings are incorporated herein and form a part of the specification.

FIG. 9 illustrates an example computer system that can be used for implementing various aspects of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
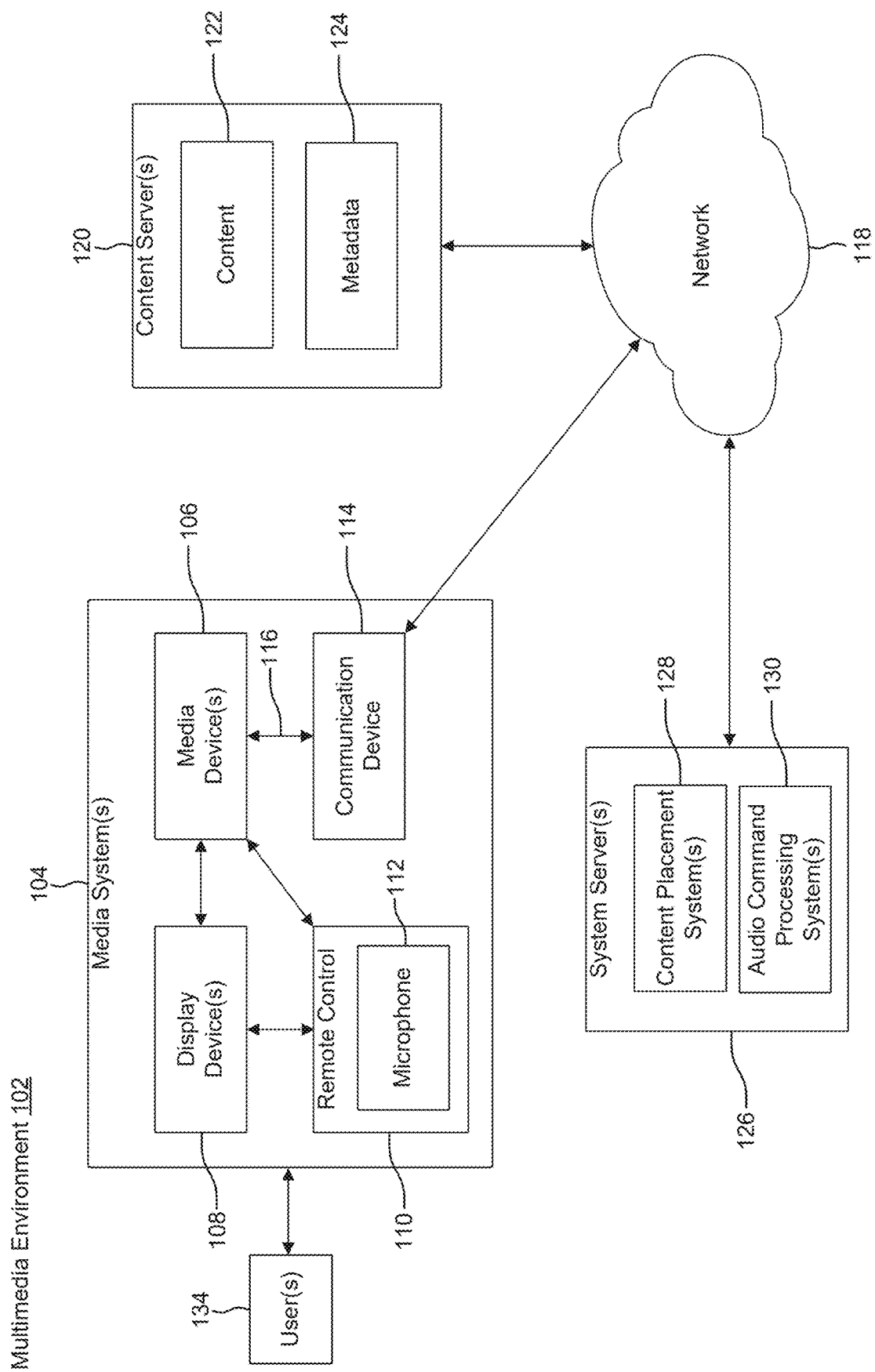
FIG. 1 illustrates a block diagram of a multimedia environment, according to some examples of the present disclosure.

Users can access and consume media content using client devices such as, for example and without limitation, mobile phones (e.g., smartphones), set-top boxes, computers (e.g., desktop computers, laptop computers, tablet computers, etc.), televisions (TVs), IPTV receivers, media devices, monitors, projectors, video game consoles, smart wearable devices (e.g., smartwatches, smartglasses, head-mounted displays (HMDs), extended reality devices (e.g., virtual reality glasses, augmented reality glasses, mixed reality glasses, virtual reality devices with video passthrough, etc.), single-board computers (SBCs) or system-on-chip (SoC) devices, and Internet-of-Things (IoT) devices, among other devices. The media content can include or encompass digital formats and/or assets such as, for example and without limitation, videos (e.g., live videos, pre-recorded or on-demand videos, streamed video content, TV shows, movies, animated videos, motion graphics videos, live action recordings, video clips, any sequence of video frames or graphics, etc.), video games, audio, text (e.g., closed captions, subtitles, and/or any other text content), graphics, and/or images, among other types.

For example, a user can use a client device to initiate a media content session to watch a movie (or any other type of media content such as a TV show, an animated video, a video clip, video recording, and/or any other type of media content as further described herein). The client device can display the movie for the user on a display of the client device or a separate/external display. In some cases, the user can use the client device to control the media content session. To illustrate, the user can use the client device to initiate the media content session, play the movie, stop the movie, pause the movie, navigate the movie (e.g., rewind, fast forward, etc.), configure the presentation settings for the movie (e.g., resize the presentation window displaying the movie, change a resolution and/or aspect ratio associated with the movie, adjust a display location or region, etc.), and/or otherwise control or manage the media content session and associated movie. Moreover, the user can control the media content session via an application or platform on the client device or accessible via the client device, such as a media player, a browser application, a cloud-based media content platform and/or application, etc.

In some cases, the client device may present secondary content, such as targeted or invitational media content (e.g., advertisements, etc.) during a media content session that includes primary content. The primary content can include any content, such as any of the types of media content previously described, and the secondary content can include any additional content such as, for example, text data such as audio-related text (e.g., closed captions, subtitles, etc.) and/or any other text (e.g., text messages, text notifications, text alerts, tags, etc.), frames (e.g., video frames and/or still images), graphics, animations, movie content, targeted or invitational content (e.g., advertisements, etc.), TV content, and/or any other media content. The term "secondary content" as used herein refers to any media content and is thus not limited to any particular type of content. In other words, the term "secondary" from "secondary content" is not intended to limit or describe the type of content being referenced, but rather to distinguish/disambiguate between references to primary content and secondary content.

As further described herein, the client device can present the secondary content within, as part of, concurrently with, in conjunction or combination with, and/or otherwise in addition to primary content associated with the media content session, such as the movie in the previous example. In some examples, the client device may present the secondary content within a window and/or display/screen used to present the primary content (e.g., the movie and/or any other media content). In such cases, the secondary content may distract the user of the client device from the primary content or may block/obfuscate the primary content (or a portion thereof) from the user's view. In other examples, the client device may interrupt (e.g., pause or stop) the primary content to present the secondary content on a same or different window and/or display. By interrupting the primary content, the presentation of the secondary content in this example may negatively impact the user's viewing experience. Thus, the interruptions, obstructions/obfuscations, and/or distractions caused by the presentation of the secondary content during the media content session can negatively impact the viewing experience of the user and may unfortunately distract, annoy, and/or inconvenience the user.

For example, the viewing experience of the user can be negatively impacted or frustrated when the client device interrupts (e.g., stops or pauses) a movie (primary content) to present an advertisement (secondary content), or when the advertisement blocks or obstructs the user's view of (and/or visibility to) the movie (or a portion thereof). Here, the interruption, obstruction, and/or distraction caused by the advertisement may negatively impact the user's perception, acceptance, and/or response to the advertisement and anything associated with the advertisement, such as a product, service, event, brand, provider, platform, and/or entity associated with the advertisement. In some cases, such interruptions, obstructions, or distractions may even prompt the user to stop the movie or use a different platform to access the movie (or other media content). Moreover, while the secondary content (e.g., the advertisement in the previous example) may otherwise provide certain benefits to the user, such as information and/or features that may be of interest to the user, the negative impact of the interruptions, obstructions, or distractions caused by the secondary content (the advertisement in this example) may outweigh or undermine the benefits to the user otherwise provided by the secondary content.

Provided herein are system, apparatus, device, method (also referred to as a process) and/or computer program product embodiments, combinations and/or sub-combinations thereof (also referred to as "systems and techniques" hereinafter) for preventing, reducing, and/or mitigating any or all interruptions, obstructions, and/or distractions caused by secondary content presented in addition to primary content during a media content session associated with the primary content. For example, the systems and techniques described herein can be used to determine where to present secondary content (e.g., a display/screen, a display location/region, etc.) during a media content session that includes primary content, how to present the secondary content in addition to the primary content, any conditions and/or triggers for presenting (or removing the presentation of) the secondary content, and/or any other settings of the secondary content and/or presentation thereof, so as to reduce/limit, prevent, and/or mitigate any or all interruptions, obstructions, and/or distractions caused by secondary content presented in addition to the primary content and, consequently, improve the viewing experience of the user and avoid (or reduce) annoying, inconveniencing, and/or otherwise frustrating the user when presenting the secondary content.

As further described herein, the systems and techniques described herein can be used to determine and/or configure secondary content to present during a media content session and in addition to primary content associated with the media content session. For example, the systems and techniques described herein can be used to determine a configuration of the secondary content to be presented in addition to primary content, such as a placement of the secondary content within a particular display/screen and/or display region (e.g., a region-of-interest or ROI). The configuration of the secondary content can be designed to prevent, mitigate, or reduce/limit interruptions of the primary content associated with the media content session, blocking or obstructing the user's view of/to the primary content (or a portion thereof) presented in the media content session, and/or distracting the user from the primary content presented in the media content session. The configuration of the secondary content can define and/or adjust any aspect or setting of the secondary content and the presentation of the secondary content.

The configuration of the secondary content can define, for example and without limitation, where to display (e.g., the placement/positioning of) the secondary content (e.g., within a window used to display the primary content, within a different window such as a picture-in-picture (PIP) window, within a screen/display used to display the primary content, within a different screen/display, within a region-of-interest (ROI) selected from a screen used to display the primary content or a different screen, etc.), any presentation settings for the secondary content (e.g., presentation settings providing for a static presentation of the secondary content, a dynamically changing presentation of the secondary content, a motion of the secondary content depicted in the presentation of the secondary content, etc.), the type of content and/or digital format of the secondary content (e.g., audio content, video content, image content, text such as audio-related text (e.g., closed captions and/or subtitles) and/or any other text, graphics, thumbnails, animated video, video clips, advertisements content, logos, visual representations of speech such as sign language visualizations/depictions, etc.), when to display the secondary content (e.g., within a period of time, at a specific time within the media content session such as a time(s) within the primary content and/or a timeline of the primary content, within (or based on) a time interval, at a time(s) when a specific portion of the primary content is displayed, in response to a detected event or action, in response to a user input, etc.), a trigger and/or condition for displaying the secondary content (e.g., based on a determination that the user is present in the scene of the client device, based on an attention level of the user, based on a counter, etc.), a specific source or provider of the secondary content, the content and/or category of content of the secondary content, and/or any other aspect of the secondary content.

In some cases, the systems and techniques described herein can determine whether there are multiple display devices available to separately display the primary content and the secondary content. For example, the systems and techniques described herein can determine whether the client device is connected to (e.g., wirelessly or via a wire) to a different display than the display used to display the primary content, or whether the client device is configured to coordinate with a different computing device the presentation of the secondary content on a different display than the display used to display the primary content. If the primary content is displayed on a first display device but a second display device is available to display the secondary content, the client device can optionally display the secondary content at the second display device to avoid interrupting or otherwise obfuscating/blocking the primary content (or any portion thereof). In some aspects, if a second display device on which to display the secondary content is unavailable or a determination is made not to use the second display device to display the secondary content, the systems and techniques described herein can identify a region-of-interest (ROI) within a display used to display the primary content, which the client device can use to display the secondary content in addition to the primary content.

In some examples, the ROI can be or include a display region used to display a portion of the primary content that has a saliency score that does not exceed a threshold saliency (e.g., a region displaying a portion of the primary content having less than a threshold saliency score). For example, the systems and techniques described herein can generate a saliency map corresponding to the primary content. In some cases, the saliency map can highlight a region(s) within the primary content on which the user's eyes are predicted to focus (and/or focus first before other regions of the primary content) or the most relevant region(s) within the primary content (e.g., most relevant to the user, most relevant for artificial intelligence (AI) and/or machine learning (ML) models, and/or most relevant to other portions of the primary content). Moreover, the saliency map can specify respective saliency scores for different portions of the primary content. The saliency map can thus be used to determine whether any portion of the primary content has a saliency score that does not exceed a saliency threshold (e.g., that is below the saliency threshold), and thereby identify any ROIs for displaying the secondary content.

In some examples, the saliency estimation can be based on image/video features and statistics used to localize the ROI(s) of a frame (e.g., a video frame or still image) of the primary content (e.g., static saliency). In other examples, the saliency estimation can additionally or alternatively be based on motion in the primary content (e.g., motion saliency), which can be estimated using optical flow and/or any other motion estimation technique. In this example, objects/elements depicted in the primary content that have motion (or a certain amount of motion) can be considered salient. In yet other examples, the saliency estimation can additionally or alternatively be based on objectness, which reflects a likelihood that a portion of image data covers or encompasses an object.

In other cases, the ROI can be or include a display region(s) that is not filled or occupied by the primary content (e.g., a region(s) that is not used to display any portion of the primary content). For example, in some cases, the aspect ratios of the primary content and the screen of the display device used to display the primary content may differ. As a result, the primary content may have a smaller width and/or height than the screen of the display device (or may be proportionally resized or scaled to better fit within the screen of the display device, which may cause the adjusted primary content to have a height and/or width that is smaller than a height and/or width of the screen of the display device). Accordingly, the primary content may fit within a subset of the screen of the display device such that a portion(s) of the screen is/are not filled or occupied by the primary content and is/are thus available to display other content, such as secondary content. Thus, in such cases, the ROI can be or include the portion(s) of the screen that is/are not filled or occupied by the primary content. Accordingly, such portion (s) of the screen identified as the ROI can be used to display the secondary content without interfering with, interrupting, and/or otherwise obstructing/obfuscating the primary content (or any portion thereof). For example, the unoccupied/ unfilled portion(s) of the screen identified as the ROI can be used to display any secondary content item such as, for example, an advertisement, a logo, closed captions or subtitles generated from speech in the primary and/or secondary content, a depiction of sign language conveying information from the speech in the primary and/or secondary content, and/or any other secondary content item.

In some cases, the aspect ratio of the primary content can be adjusted so the adjusted primary content fits within a smaller portion of the screen, which can allow the screen to be used to display the adjusted primary content while leaving a portion(s) of the screen unoccupied/unfilled by the primary content and available to display the secondary content (or a portion thereof). For example, the size and aspect ratio of the primary content can be reduced so the height and/or width of the adjusted primary content is smaller than a height and/or width of the screen used by the display device to display the primary content. This in turn can make a region(s) of the screen available to display the secondary content (or a portion thereof), as that region(s) of the screen is not occupied or filled by the adjusted primary content (e.g., is not used or needed to display the adjusted primary content). Such region(s) of the screen can thus be designated as the ROI for displaying the secondary content (or a portion thereof), and consequently used to display the secondary content (or the portion thereof) without interfering with, interrupting, or blocking/obfuscating any portion of the primary content displayed on the remaining portion(s) of the screen. To illustrate, in some aspects, AI/ML and/or computer vision (CV) algorithm(s) can be used to selectively retarget content from one aspect ratio to a different aspect ratio in order to fit the content (and/or other content) within the screen of a display or an ROI on the screen. In some cases, if adjusting the content from one aspect ratio to a different aspect ratio results in some information loss, the AI/ML and/or CV algorithm(s) can ensure that the most salient portion(s) of the content (e.g., the portion(s) with the highest saliency score(s)), such as faces and foreground regions, remain in the adjusted content.

The present disclosure recognizes that the use of personal information data can be used to the benefit of users. For example, personal information data can be used to better understand user behavior, facilitate and measure the effectiveness of applications and delivered digital content. Accordingly, use of such personal information data enables calculated control of the delivered digital content. For example, the system can reduce the number of times a user receives certain content and can thereby select and deliver content that is more meaningful to users. Such changes in system behavior improve the user experience. Further, other uses for personal information data that benefit the user are also contemplated by the present disclosure. The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. Moreover, the present disclosure includes mechanisms which can be implemented to protect the privacy of users and anonymize data collected. Although the present disclosure may cover use of personal information data to implement one or more various disclosed embodiments, the present disclosure also contemplates that the various embodiments can also be implemented without the need for accessing and/or reporting such personal information data and/or with protections to maintain the user's privacy. The various embodiments of the present technology are not rendered inoperable due to the lack of all or a portion of such personal information data.

Various embodiments and aspects of this disclosure may be implemented using and/or may be part of multimedia environment 102 shown in FIG. 1. It is noted, however, that the multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Example Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 can include and/or represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. Any user 134 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Each of the one or more media devices 106 may be or include a streaming media device, DVD or BLU-RAY device, audio/video playback device, cable box, and/or digital video recording device, to name just a few examples. Display device 108 may include or be part of a monitor, television (TV), desktop computer, laptop computer, mobile phone (e.g., smartphone), tablet computer, wearable device (e.g., a smartwatch, an HMD, smartglasses, etc.), screen, appliance, internet-of-things (IoT) device, SBC or SoC, and/or projector, to name just a few examples. In some examples, each of the one or more media devices 106 can be a part of, integrated with, operatively coupled to, and/or connected to a respective display device 108.

Each of the one or more media devices 106 may be configured to communicate with network 118 via a respective communication device 114. The communication device 114 may include, for example, a cable modem or satellite TV transceiver. The one or more media devices 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the one or more media device 106 and/or display device 108, such as a remote control, a tablet, laptop computer, mobile phone (e.g., smartphone), wearable, on-screen controls, integrated control buttons, audio controls, or any combination thereof, to name just a few examples. In some examples, the remote control 110 wirelessly communicates with the one or more media devices 106 and/or display device 108 using cellular, Bluetooth, infrared, etc., or any combination thereof. The remote control 110 may include a microphone 112, which is further described below.

The multimedia environment 102 may include one or more content servers 120 (also called content providers, channels or sources). Although only one content server is shown in FIG. 1, in practice, the multimedia environment 102 may include any number of content servers. Each of the one or more content servers 120 may be configured to communicate with network 118.

Each of the one or more content servers 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, and/or any other content or data objects in electronic form.

In some examples, metadata 124 can include data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The one or more system servers 126 may operate to support the one or more media devices 106 from the cloud. It is noted that the structural and functional aspects of the one or more system servers 126 may wholly or partially exist in the same or different ones of the system servers 126.

In some examples, the one or more system servers 126 may include a content placement system 128. The content placement system 128 can include, be part of, be implemented by, and/or represent one or more computing systems such as, for example and without limitation, one or more server computers, datacenters, virtual or logical systems (e.g., virtual machines (VMs), software containers, etc.) and/or software compute resources, computing devices (e.g., laptop computers, desktop computers, tablet computers, networking devices such as switches and controllers, smart and/or IoT devices, etc.), hardware compute resources (e.g., processors, memory, etc.), integrated circuits or computer chips (e.g., SoCs, SBCs, field-programmable gate arrays (FPGAs), application-specific integrated circuits, etc.), cloud-based resources (e.g., cloud-based hardware resources and/or cloud-based software resources such as cloud-based applications), and/or any other software and/or hardware computing systems. In some cases, the content placement system 128 can include, host, and/or represent one or more models and/or algorithms such as, for example and without limitation, an artificial intelligence (AI)/machine learning (ML) model, a data processing and/or preprocessing model/algorithm, an image processing algorithm, a computer vision algorithm, a neural network, etc.

In some aspects, the content placement system 128 can determine and/or configure secondary content for the media device(s) 106 to display at the display device(s) 108 (and/or any other display device/devices) in addition to primary content such as, for example and without limitation, videos (e.g., live videos, pre-recorded or on-demand videos, streamed video content, TV shows, movies, animated videos, motion graphics videos, live action recordings, video clips, any sequence of video frames or graphics, etc.), video games, multimedia content, graphics, and/or images, among other types of content items. For example, the content placement system 128 can determine where to present secondary content (e.g., a display/screen, a display location/region, etc.) during a media content session of the user(s) 132 that includes primary content, how to present the secondary content in addition to the primary content, any conditions and/or triggers for presenting (or removing or preventing the presentation of) the secondary content, and/or any other settings of the secondary content and/or presentation thereof. In some examples, the content placement system 128 can configure the secondary content so as to reduce/limit, prevent, and/or mitigate any or all interruptions, obstructions, and/or distractions caused by the secondary content being displayed (and/or to be displayed) for the user(s) 132 (e.g., displayed at the display device(s) 108 and/or another display) in addition to the primary content and, consequently, improve the viewing experience of the user(s) 132 and avoid (or reduce) annoying, inconveniencing, and/or otherwise frustrating the user(s) 132 when displaying the secondary content.

In some aspects, the content placement system 128 can determine and/or specify a configuration of the secondary content to be presented to the user(s) 132 in addition to primary content. For example, the content placement system 128 can determine and/or specify a placement of the secondary content within a particular display device (e.g., display device(s) 108 and/or a different display device) and/or display region (e.g., an ROI within a screen/display, window, interface, etc.). The configuration of the secondary content can be designed to prevent, mitigate, or reduce/limit interruptions of the primary content consumed by the user(s) 132 via the media device(s) 106. Moreover, the configuration of the secondary content can be designed to prevent, mitigate, or reduce/limit blocking or obstructing a view of the user(s) 132 of/to the primary content (or a portion thereof) presented in addition to the secondary content, and/or distracting the user(s) 132 from the primary content presented in addition to the secondary content. The configuration of the secondary content can define and/or adjust any aspect or setting of the secondary content and the presentation of the secondary content.

The configuration of the secondary content can define, for example and without limitation, where to display (e.g., the placement/positioning of) the secondary content (e.g., within a window used to display the primary content, within a different window such as a picture-in-picture (PIP) window, within a screen/display used to display the primary content such as display device(s) 108, within a different screen/display, within an ROI selected for the secondary content as further described herein, etc.), any presentation settings for the secondary content (e.g., presentation settings providing for a static presentation of the secondary content, a dynamically changing presentation of the secondary content, a motion of the secondary content depicted in the presentation of the secondary content, etc.), the type of content and/or digital format of the secondary content (e.g., audio content, video content, image content, text such as audio-related text (e.g., closed captions and/or subtitles) and/or any other text, graphics, thumbnails, animated video, video clips, advertisements content, logos, visual representations of speech such as sign language visualizations/depictions, etc.), when to display the secondary content (e.g., within a period of time, at a specific time within the media content session such as a time(s) within the primary content and/or a timeline of the primary content, within (or based on) a time interval, at a time(s) when a specific portion of the primary content is displayed, in response to a detected event or action, in response to a user input, etc.), a trigger and/or condition for displaying the secondary content (e.g., based on a determination that the user(s) 132 is present in a scene that includes the media device(s) 106 and/or the display device(s) 108, based on an attention level of the user(s) 132, based on a counter, etc.), a specific source or provider of the secondary content, the content and/or category of content of the secondary content, and/or any other aspect of the secondary content.

In some cases, the content placement system 128 can determine an ROI within a screen/display (e.g., display device(s) 108) displaying primary content for the user(s) 132, which can be used to display the secondary content for the user(s) 132 in addition to the primary content. In some examples, the content placement system 128 can identify the ROA within the screen/display based on saliency scores calculated by the content placement system 128 for various portions of the primary content displayed (and/or to be displayed) at the screen/display. For example, the content placement system 128 can generate a saliency map based on the primary content (or a portion thereof). The saliency map can include respective saliency scores for portions of the primary content displayed (or to be displayed) at the screen/display, which the content placement system 128 can use to determine an ROI within the screen/display where the secondary content can be displayed. In some examples, the ROI can include a region of the primary content having a saliency score that equals to or is less than a saliency threshold. Moreover, the content placement system 128 can use any saliency estimation/detection techniques described herein (e.g., static saliency, motion saliency, objectness, etc.), known (and/or developed in the future) in the computer vision field (and/or any other field), and/or available now and/or in the future. In some cases, the content placement system 128 can identify the ROI selected for displaying the secondary content based on an attention level of the user(s) 132.

As used herein, the attention level of a user can include, represent, or be based on an eye gaze of the user and/or a direction in which the user's face is facing. The eye gaze of the user and information about a direction that the user's face is facing can be determined with informed consent of the user, and data used to make such determinations can be collected with the informed consent of the user and safeguarded/secured according to privacy and security policies and procedures as well as recognized industry and governmental standards and requirements for collecting, maintaining, and protecting/safeguarding such information. In some examples, the eye gaze of a user (e.g., the attention level of the user) can be determined (with consent of the user) using any eye detection, eye tracking, gaze estimation, gaze tracking, face detection, and/or face tracking technology/technique (e.g., algorithm, AI/ML model/network, computer vision system/process, image processing system/process, etc.). For example, the content placement system 128 can obtain image data (e.g., from an image/camera sensor, an infrared sensor, etc.) depicting the eyes (or a portion thereof) of the user(s) 132 and can use the image data to estimate or track the eye gaze/movements of the user(s) 132 using any eye tracking and/or gaze detection/estimation techniques/technologies known (and/or developed in the future) in the computer vision field (and/or any other field) and/or available now and/or in the future.

The one or more system servers 126 may also include an audio command processing system 130. As noted above, the remote control 110 may include a microphone 112. The microphone 112 may receive audio data from users 134 (as well as other sources, such as the display device 108). In some examples, the one or more media devices 106 may be audio responsive, and the audio data may represent verbal commands from the user 134 to control the one or more media devices 106 as well as other components in the media system 104, such as the display device 108.

In some examples, the audio data received by the microphone 112 in the remote control 110 can be transferred to the one or more media devices 106, which can then be forwarded to the audio command processing system 130 in the one or more system servers 126. The audio command processing system 130 may operate to process and analyze the received audio data to recognize the verbal command of the user 134. The audio command processing system 130 may then forward the verbal command back to the one or more media devices 106 for processing.

Figure 2:
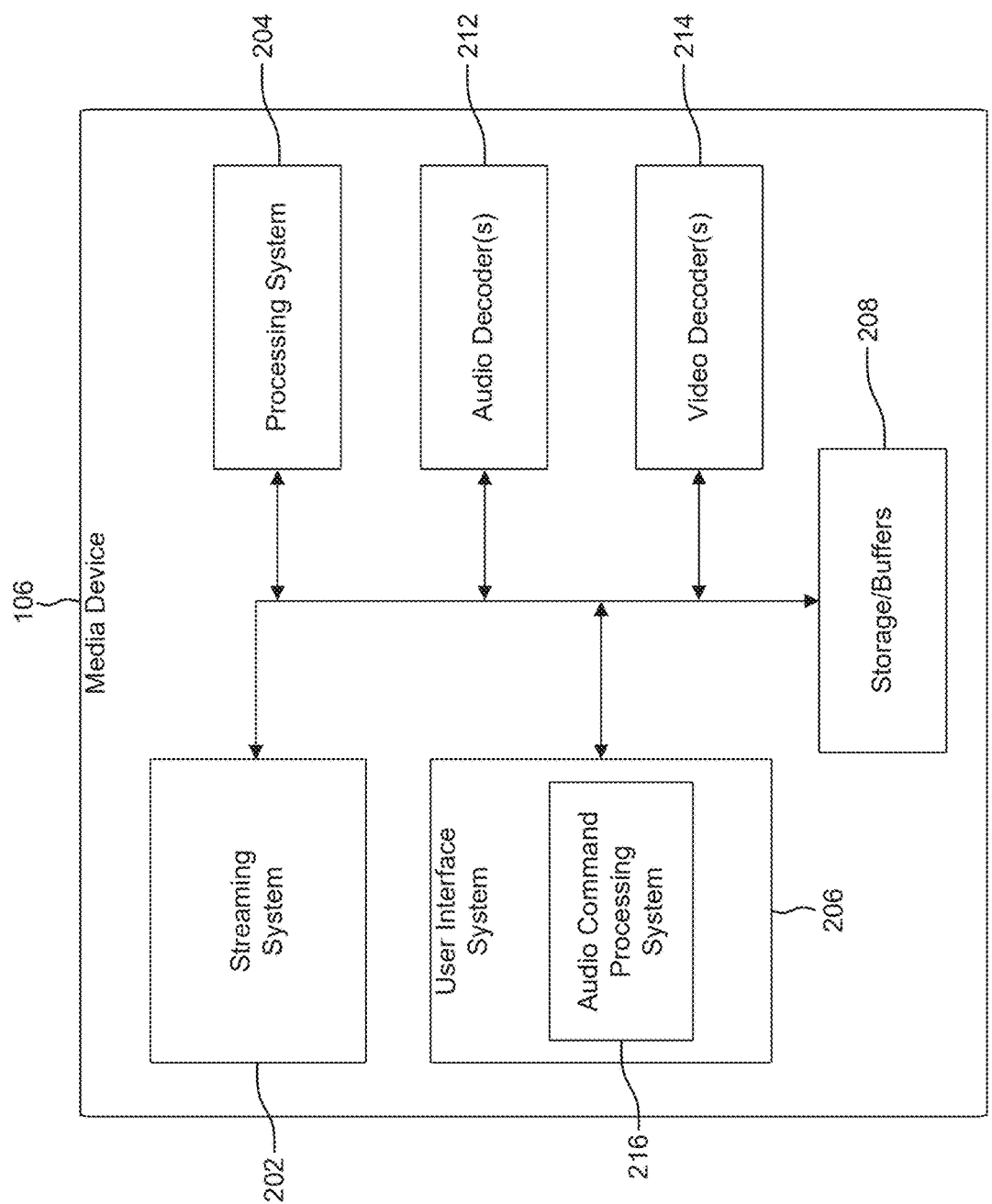
FIG. 2 illustrates a block diagram of a streaming media device, according to some examples of the present disclosure.

In some examples, the audio data may be alternatively or additionally processed and analyzed by an audio command processing system 216 in the one or more media devices 106 (see FIG. 2). The one or more media devices 106 and the one or more system servers 126 may then cooperate to pick one of the verbal commands to process (either the verbal command recognized by the audio command processing system 130 in the one or more system servers 126, or the verbal command recognized by the respective audio command processing system 216 in the one or more media devices 106).

FIG. 2 illustrates a block diagram of an example media device, according to some embodiments. In FIG. 2, the media device 106 represents a media device from the one or more media devices 106. Moreover, the media device 106 in FIG. 2 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 134 may interact with the media device 106 via, for example, the remote control 110. For example, the user 134 may use the remote control 110 to interact with the user interface module 206 of the media device 106 to select content, such as a movie, TV show, music, book, application, game, etc. The streaming system 202 of the media device 106 may request the selected content from the one or more content servers 120 over the network 118. The one or more content servers 120 may transmit the requested content to the streaming system 202. The media device 106 may transmit the received content to the display device 108 for playback to the user 134.

In streaming examples, the streaming system 202 may transmit the content to the display device 108 in real time or near real time as it receives such content from the one or more content servers 120. In non-streaming examples, the media device 106 may store the content received from one or more content servers 120 in storage/buffers 208 for later playback on display device 108.

Determining and Configuring Secondary Content for Display with Primary Content

Referring to FIG. 1, the content placement system 128 in the one or more system servers 126 can operate to determine and/or configure secondary content for the media device(s) 106 to display at the display device(s) 108 (and/or any other display device/devices) in addition to primary content. The primary content can include, for example and without limitation, videos (e.g., live videos, pre-recorded or on-demand videos, streamed video content, TV shows, movies, animated videos, motion graphics videos, live action recordings, video clips, any sequence of video frames or graphics, etc.), video games, audio, text, multimedia content, graphics, and/or images, among other types of content items. As used herein, "secondary content" refers to any digital content provided in addition to the primary content, including any type of primary content. In other words, the term "secondary" in secondary content is used to distinguish/disambiguate references to such content or content items from references to primary content, and is not intended to limit the scope of the term "secondary content" to any particular type of content and/or content format. To illustrate, the secondary content as used herein can include any type of digital content such as, for example and without limitation, videos (e.g., live videos, pre-recorded or on-demand videos, streamed video content, TV shows, movies, animated videos, motion graphics videos, live action recordings, video clips, any sequence of video frames or graphics, etc.), video games, visual (e.g., video, image, graphics) animations, text (e.g., messages, alerts, comments, audio-related text such as closed captions and/or subtitles, etc.), audio, advertisements and/or any invitational content, thumbnails, sign language visualizations/depictions, visualizations/depictions of human gestures, computer-generated graphics and/or any other graphics, multimedia content, images, and/or any other type of media content.

In some examples, the content placement system 128 can determine where to present secondary content (e.g., a display/screen, a display location/region, etc.) during a media content session of the user(s) 132 that includes primary content, how to present the secondary content in addition to the primary content, any conditions and/or triggers for presenting (or removing or preventing the presentation of) the secondary content, and/or any other settings of the secondary content and/or presentation thereof. In some examples, the content placement system 128 can configure the secondary content so as to reduce/limit, prevent, and/or mitigate any or all interruptions, obstructions, and/or distractions caused by the secondary content being displayed (and/or to be displayed) for the user(s) 132 (e.g., displayed at the display device(s) 108 and/or another display) in addition to the primary content and, consequently, improve the viewing experience of the user(s) 132 and avoid (or reduce) annoying, inconveniencing, and/or otherwise frustrating the user(s) 132 when displaying the secondary content.

In some aspects, the content placement system 128 can determine and/or specify a configuration of the secondary content to be presented to the user(s) 132 in addition to primary content. For example, the content placement system 128 can determine and/or specify a placement of the secondary content within a particular display device (e.g., display device(s) 108 and/or a different display device)

and/or display region (e.g., an ROI within a screen/display, window, interface, etc.). The configuration of the secondary content can prevent, mitigate, or reduce/limit interruptions of the primary content consumed by the user(s) 132 via the media device(s) 106. Moreover, the configuration of the secondary content can prevent, mitigate, or reduce/limit blocking or obstructing a view of the user(s) 132 to the primary content (or a portion thereof) presented in addition to the secondary content, and/or distracting the user(s) 132 from the primary content presented in addition to the secondary content. In some examples, the secondary content can provide certain features and/or information for the user(s) 132 to improve the viewing experience of the user(s) 132. For example, the secondary content can include closed captions and/or subtitles generated (e.g., pre-generated or generated live/dynamically/on-demand) from speech included in an audio portion of the primary content and/or the secondary content. As another example, the secondary content can additionally or alternatively include links to relevant information and/or a visual rendering/depiction/animation of sign language conveying information from any speech included in an audio portion of the primary content and/or the secondary content.

The configuration of the secondary content can define and/or adjust any aspect or setting of the secondary content and the presentation of the secondary content. For instance, the configuration of the secondary content can define, for example and without limitation, where to display the secondary content, any presentation settings for displaying the secondary content, the type of content and/or digital format of the secondary content, when to display the secondary content, a trigger and/or condition for displaying the secondary content, a specific source or provider of the secondary content, the content and/or category of content of the secondary content, and/or any other aspect of the secondary content.

The disclosure now continues with a further discussion of determining secondary content and/or a configuration (e.g., a type, placement, presentation/rendering, etc.) of secondary content for presentation to a user(s) 132 in addition to primary content accessed by the user(s) 132.

Figure 3:
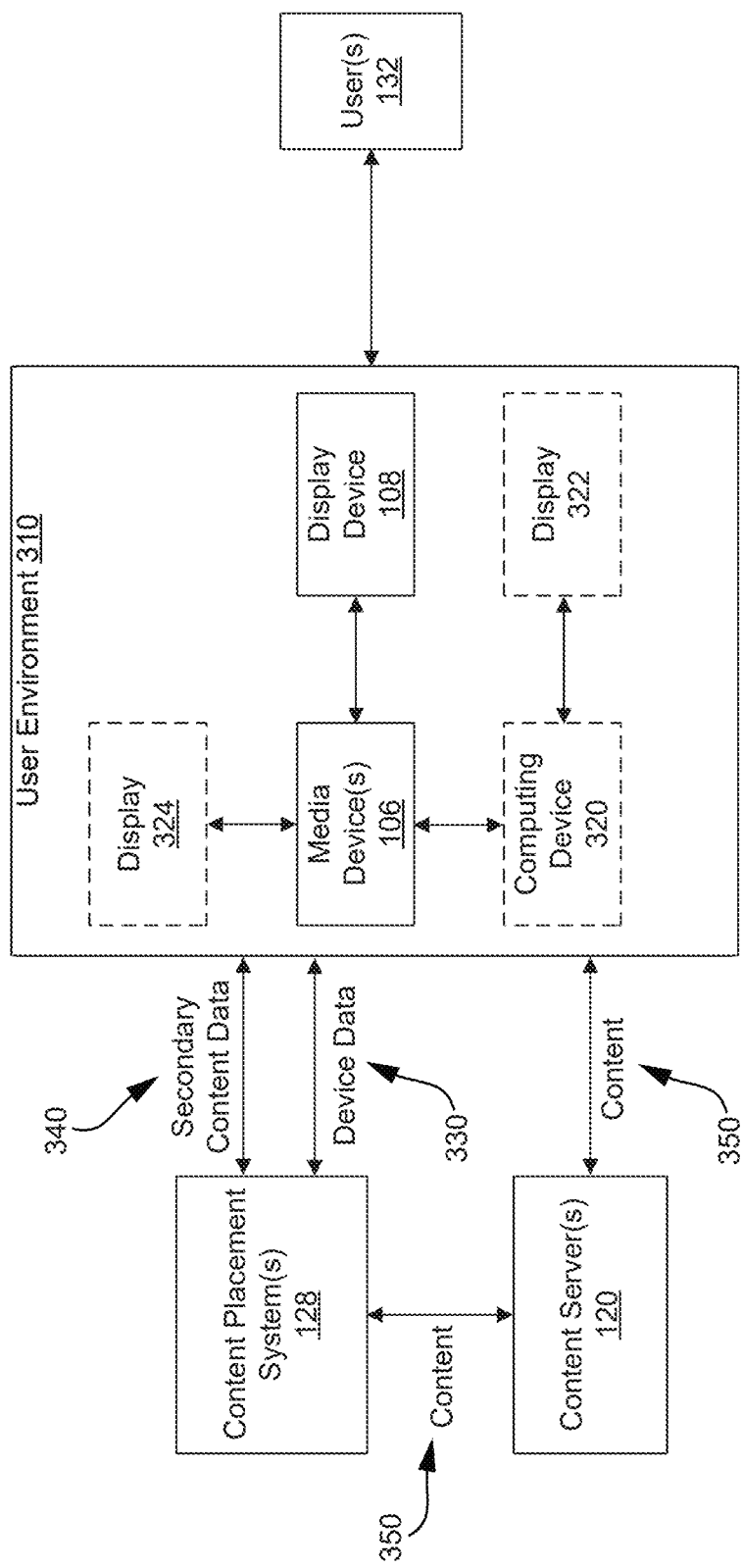
FIG. 3 is a diagram illustrating an example system for determining a configuration of secondary content for presentation to a user, according to some examples of the present disclosure.

FIG. 3 is a diagram illustrating an example system for determining secondary content and/or a configuration of secondary content for presentation to a user(s) 132, according to some examples of the present disclosure. The secondary content can be displayed for the user(s) 132 in addition to primary content accessed/consumed by the user(s) 132. The secondary content can be displayed on a same display device(s) as the primary content and/or a different display device(s). For example, the secondary content can be displayed at the display device 108, the display 322, and/or the display 324, as further described herein.

The example user environment 310 shown in FIG. 3 can represent a scene of the user(s) 132, such as a room, a house, an office, a patio, and/or any other space where the user(s) 132 is located. The user environment 310 can include the media device(s) 106 and the display device(s) 108 used by the user(s) 132 to access and consume content, among other things. The user environment 310 can also optionally include a computing device 320 connected to (e.g., wirelessly and/or via a wire) to a display 322 and/or another display 324 capable of displaying content from the media device(s) 106, the content placement system 128, the content server(s) 120, the computing device 320, and/or any other computing device. The display 322 and the display 324 can each include any type of display device such as, for example and without limitation, a television (TV), a monitor, a projector, an HMD, smartglasses, a heads-up display (HUD), a smartwatch, an IoT device with display capabilities, a display peripheral, an extended reality device, and/or any other device with display capabilities. Extended reality (XR) as used herein can include virtual reality (VR), augmented reality (AR), mixed reality (MR), virtual reality with video passthrough, and/or any other extended reality implementation. Moreover, the computing device 320 can include any type of computing device such as, for example and without limitation, a computer (e.g., a tablet, laptop, or desktop computer), a smart television, a set-top box, a video game console, a mobile phone (e.g., a smartphone), a video conferencing system, a smartwatch, smartglasses, an XR system, an integrated circuit board (e.g., an FPGA, an ASIC, an SoC, an SBC, etc.), and/or any other compute system.

As further described herein, the content placement system 128 and/or the media device(s) 106 can optionally use the computing device 320, the display 322, and/or the display 324 (e.g., in addition to the display device(s) 108) to display secondary content (e.g., with or in addition to primary content). For example, in some cases, the media device(s) 106 can use the display device(s) 108 to display primary content for the user(s) 132. If the display 322 and/or the display 324 is available for displaying secondary content for the user(s) 132, the content placement system 128 and/or the media device(s) 106 can optionally select to use the display 322 and/or the display 324 to display secondary content while the primary content is displayed at the display device(s) 108. This way, the presentation of the secondary content does not interrupt the primary content, block/obfuscate any portion of the primary content, affect the presentation of the primary content.

In some cases, the media device 106 can receive, from content server(s) 120, content 350 for display to the user(s) 132 via the display device(s) 108, the display 324, and/or the display 322 (e.g., in coordination with the computing device 320 connected to the display 322). The content 350 can include primary content, such as movies, TV shows, videos (e.g., live videos, pre-recorded or on-demand videos, animated videos, video clips, and/or any sequence of video frames), images, graphics, text, and/or any other content items. In some examples, the primary content (and any other portion of the content 350) from the content server(s) 120 can also include other types of media content such as audio. In some cases, the content 350 can also include secondary content for display as described herein.

In some cases, the content server(s) 120 can additionally or alternatively provide the content 350 to the content placement system 128. The content placement system 128 can obtain primary and/or secondary content from the content 350, which the content placement system 128 can then provide to the media device(s) 106 and/or use to determine secondary content data 340 provided to the media device(s) 106. The secondary content data 340 can include secondary content for the user(s) 132 and/or configuration data used to select what secondary content to present to the user(s) 132, configure the secondary content prior to display to the user(s) 132, and/or configure the presentation/display of secondary content for the user(s) 132.

For example, the secondary content data 340 can include data and/or instructions defining a configuration to be used to present the secondary content to the user(s) 132. The configuration used to present the secondary content can define or specify, for example and without limitation, where to display (e.g., the placement/positioning of) the secondary content (e.g., within a window used to display the primary content, within a different window such as a picture-inpicture (PIP) window, within a screen/display used to display the primary content such as display device(s) 108, within a different screen/display, within an ROI selected for the secondary content as further described herein, etc.), any presentation settings for the secondary content (e.g., presentation settings providing for a static presentation of the secondary content, a dynamically changing presentation of the secondary content, a motion of the secondary content depicted in the presentation of the secondary content, etc.), the type of content and/or digital format of the secondary content (e.g., audio content, video content, image content, text such as audio-related text (e.g., closed captions and/or subtitles) and/or any other text, graphics, thumbnails, animated video, video clips, advertisements content, logos, visual representations of speech such as sign language visualizations/depictions, etc.), when to display the secondary content (e.g., within a period of time, at a specific time within the media content session such as a time(s) within the primary content and/or a timeline of the primary content, within (or based on) a time interval, at a time(s) when a specific portion of the primary content is displayed, in response to a detected event or action, in response to a user input, etc.), a trigger and/or condition for displaying the secondary content (e.g., based on a determination that the user(s) 132 is present in a scene that includes the media device(s) 106 and/or the display device(s) 108, based on an attention level of the user(s) 132, based on a counter, etc.), a specific source or provider of the secondary content, the content and/or category of content of the secondary content, and/or any other aspect of the secondary content.

In some examples, the configuration from the secondary content data 340 can specify whether to display the secondary content at the display device(s) 108, the display 324, and/or the display 322. For instance, if the media device(s) 106 uses the display device(s) 108 to display primary content for the user(s) 132, the configuration can include instructions indicating that the secondary content should be displayed at the display 322 and/or the display 324 to avoid interrupting or interfering with the primary content displayed at the display device(s) 108. In some cases, if the primary content fits entirely within a screen of the display device(s) 108 or does not otherwise leave any portion of the screen of the display device(s) 108 available or unused by the primary content (e.g., any portion of the screen not occupied or filled by the primary content because, for example, the size and/or aspect ratio of the screen of the display device(s) 108 does not match the size and/or aspect ratio of the primary content), the configuration may instruct the media device(s) 106 to use the display 322 and/or the display 324 to display the secondary content, rather than the display device(s) 108.

In some aspects, if the configuration specifies that the media device(s) 106 display the secondary content (and/or any other content, such as primary content) at the display 322 connected to the computing device 320, the media device(s) 106 can coordinate with the computing device 320 the presentation of such content at the display 322. For example, in some cases, the secondary content data 340 providing/defining the configuration can include instructions and/or commands used by the media device(s) 106 to instruct the computing device 320 to display the secondary content at the display 322 connected to the computing device 320, or used by the media device(s) 106 and/or the computing device 320 to coordinate display of the secondary content at the display 322 connected to the computing device 320. In some cases, the media device(s) 106 and/or the computing device 320 can include code (e.g., code included in the secondary content data 340 or pre-installed code) configured to cause the media device(s) 106 to coordinate with the computing device 320 (and/or vice versa) the presentation of secondary content at the display 322. To illustrate, the code can trigger communications and/or instructions between the media device(s) 106 and the computing device 320 to coordinate presentation of the secondary content at the display 322.

In some aspects, to coordinate presentation of secondary content at the display 322, the media device(s) 106 and the computing device 320 can communicate via a network, such as a local area network (e.g., wireless and/or wired local area network), a personal area network (PAN), and/or any other network connection. In some cases, the media device(s) 106 and the computing device 320 can additionally or alternatively communicate with each other via a direct wired and/or wireless connection with each other such as, for example, a direct WiFi connection, a Bluetooth connection, an ad hoc connection, a near field communication (NFC) connection, a Thread connection, a Bluetooth Low Energy (BLE) connection, a Zigbee connection, and/or any other direct and/or short-range connection.

In some aspects, the media device(s) 106 and the computing device 320 can be interconnected via respective ports on the media device(s) 106 and the computing device 320 with data capabilities, such as a high-definition multimedia interface (HDMI) port, a universal serial bus (USB) connection, and/or any other ports. In some examples, the media device(s) 106 can use such interconnectivity between the media device(s) 106 and the computing device 320, to provide to the computing device 320 secondary content for display at the display 322, instructions/commands for displaying the secondary content, and/or data specifying a configuration used to display the secondary content (e.g., a configuration of the secondary content and/or a presentation thereof). In some cases, the media device(s) 106 can also leverage processing capabilities of the computing device 320 to process and/or display the secondary content at the display 322. For example, the media device(s) 106 can use processing capabilities of the computing device 320 to process or preprocess the secondary content prior to display at the display 322 and/or configure the display of the secondary content at the display 322.

In some examples, the media device(s) 106 and the computing device 320 can be configured in a master-slave model used to coordinate the display of secondary content at the display 322. For example, the media device(s) 106 can be designated as a master device and the computing device 320 as a slave device. Here, the media device(s) 106 can control the computing device 320 to configure and/or display secondary content at display 322.

In some cases, the media device(s) 106 can push secondary content and/or data used to display the secondary content (e.g., configuration data) to the computing device 320, the display 322, and/or the display 324. For example, the media device(s) 106 can wirelessly push the secondary content and/or data specifying a configuration of the secondary content to the computing device 320, the display 322, and/or the display 324. The computing device 320, display 322, and/or display 324 can use such data to display the secondary content as desired/specified.

In some examples, the content placement system 128 can use the content 350 from the content server(s) 120 and/or device data 330 from the media device(s) 106 to determine what secondary content (and/or what type of secondary content) to display for the user(s) 132, how to display the secondary content, when to display the secondary content, and/or any other data used to configure and/or display the secondary content. For example, the content placement system 128 can select secondary content from the content 350 based on the device data 330 and/or information from the content server(s) 120 (e.g., information indicating what secondary content is available or preferred, etc.), and can use the device data 330 and/or information about the secondary content to determine how and/or when to display the secondary content.

The device data 330 can include, for example and without limitation, data about the capabilities of the media device(s) 106, data about the capabilities of any other device in the user environment 310 (e.g., the display device(s) 108, the computing device 320, the display 322, the display 324, etc.), user and/or content preferences, content statistics, device location information, user information (e.g., user profile, user statistics, demographics, user location, user identity, etc.), log data, historical data, input data from the user(s) 132 (e.g., provided via the media device(s) 106), sensor data collected by one or more sensors (e.g., image data from one or more image/camera sensors, location and/or distance measurements from a time-of-flight (TOF) camera sensor and/or a ranging sensor, ambient light levels measured by one or more light sensors, etc.) in the user environment 310 (and/or one or more sensors of any of the devices in the user environment 310, such as the media device(s) 106, the computing device 320, the display 322, and/or the display 324), network and/or device connectivity information, information about the user environment 310, and/or any other information about the user(s) 132, the user environment 310, and/or any of the devices in the user environment 310. In some cases, the content placement system 128 can use such device data 330 to determine what primary content is being displayed (or is requested for display) for the user(s) 132 (e.g., at the display 108 and/or any other display), what devices are available in the user environment 310 to display secondary content for the user(s) 132, where to display the secondary content for the user(s) 132 (e.g., display device 108, display 322, and/or display 324), how to configure the secondary content and/or the presentation of the secondary content for the user(s) 132, and/or any other information used to configure and/or display (and/or coordinate the configuration and/or display of) the secondary content.

For example, the content placement system 128 can process image data in the device data 330 (e.g., obtained from one or more sensors) depicting the eyes and/or face of the user(s) 132. The content placement system 128 can use the image data to track and/or detect an attention level of the user(s) 132. The content placement system 128 can use the information about the attention level of the user(s) 132 to determine what display to use to display the secondary content and/or determine an ROI within primary content displayed for the user(s) 132. For example, the content placement system 128 can use such information about the attention level of the user(s) 132 to estimate a field-of-view (FOV) of the user(s) 132 at any given time(s), determine what display the user(s) 132 is looking at or facing at any given time(s), and/or what display region (and/or what portion of displayed content) the user(s) 132 is looking at or facing at any given time. The content placement system 128 can use such information to select a display in the user environment 310 to use to display the secondary content and/or select an ROI within the primary content (and/or a display displaying the primary content) that can be used to present the secondary content without interfering with the user's ability to see the primary content (or with less or minimal interference). In some cases, the secondary content data 340 from the content placement system 128 can identify for the media device(s) 106 which display in the user environment 310 should be used to display the secondary content and/or a location within a display and/or the primary content on which to place/display the secondary content, such as an ROI within the primary content.

As previously noted, the content placement system 128 can determine an ROI on which to place/display the secondary content for the user(s) 132. In some cases, the ROI can be or include a region within the primary content. In other examples, the ROI can be or include an available/unused region within the display (e.g., display device(s) 108 or any other display in the user environment 310) displaying the primary content, such as an extra display region of the display device that is not used (or will not be used) to display any portion of the primary content. For example, the content placement system 128 can determine a size or aspect ratio of the screen of the display device(s) 108 differs from the size or aspect ratio of the primary content. Based on the determination that the size or aspect ratio of the screen of the display device(s) 108 differs from the size or aspect ratio of the primary content, the content placement system 128 can determine that, when the display device(s) 108 displays the primary content, the primary content does not (or will not) encompass (e.g., cover, occupy, fill) the entire screen of the display device(s) 108 and an extra region(s) of the screen (e.g., a region(s) that does not include or display any portion of the primary content) is available/unused and can be used to display the secondary content (or a portion thereof). The content placement system 128 can then select such extra region(s) as an ROI on which to display the secondary content (or a portion thereof). In some cases, the content placement system 128 can identify (e.g., via the secondary content data 340) such extra region(s) as an ROI on which the media device(s) 106 can display the secondary content without interfering with the primary content.

In some examples, the ROI identified as a display location for the secondary content can be or include a display region used to display a portion of the primary content that has a saliency score that does not exceed a threshold saliency (e.g., a region displaying a portion of the primary content having less than a threshold saliency score). For example, the content placement system 128 can analyze the primary content and generate a saliency map based on the primary content. In some cases, the saliency map can highlight a region(s) within the primary content on which the user(s) 132 is predicted to focus (and/or focus first before other regions of the primary content) or the most relevant region(s) within the primary content (e.g., most relevant to the user(s) 132, most relevant for AI/ML models, most relevant to other portions of the primary content, etc.). Moreover, the saliency map can specify respective saliency scores for different portions of the primary content, which can indicate the saliency of the different portions of the primary content. The content placement system 128 can use the saliency map to determine whether any portion of the primary content has a saliency score that does not exceed a saliency threshold (e.g., that is below the saliency threshold), and thereby identify any ROIs for displaying the secondary content. For example, the content placement system 128 can identify a region having a saliency score that is less than or equal to the saliency threshold, and designate such region as an ROI for displaying secondary content.

The saliency estimation can measure entropy in a local window and/or region. For example, a white wall in a local window may have a lower saliency score than a barcode as the barcode would have more entropy than the white wall. The saliency score can be used to identify an ROI with lower/lowest entropy for placing a content item, such as secondary content, as placing such content on an ROI with lower/lowest entropy will be less disruptive to the user's viewing experience than placing such content on a region with higher entropy. To illustrate, placing (e.g., overlaying/superimposing) an advertisement in a region depicting the sky is less disruptive to the user's viewing experience than superimposing an advertisement on a skyscraper. Similarly, placing (e.g., overlaying/superimposing) content depicting a plane flying with a banner in a region depicting the sky is less disruptive to the user's viewing experience than superimposing such content on the skyscraper or a content region depicting a face. In some cases, the content placement system 128 can decide based on thresholds associated with saliency estimation and seam carving algorithms which algorithm to use to identify an ROI for inserting secondary content and/or which algorithm to use to insert secondary content within an ROI.

In some examples, the saliency estimation can be based on image/video features and/or statistics (e.g., from the device data 330) used to locate the ROI(s) of a frame (e.g., a video frame or still image) of the primary content (e.g., static saliency). In other examples, the saliency estimation can additionally or alternatively be based on motion in the primary content (e.g., motion saliency), which can be estimated using optical flow and/or any other motion estimation technique. In this example, objects/elements depicted in the primary content that have motion (or a certain amount of motion) can be considered salient (or given a certain saliency score). In yet other examples, the saliency estimation can additionally or alternatively be based on objectness, which reflects a likelihood that a portion of image data (e.g., from the device data 330) covers or encompasses an object, such as an object of interest, a foreground object, etc.

In some cases, the ROI can be or include a display region(s) of the display used to display the primary content (e.g., display device(s) 108 or any other display in the user environment 310), that does not include any portion of the primary content and/or is not used by the primary content (e.g., a region(s) that is not displaying any portion of the primary content). For example, as previously noted, if the size and/or aspect ratio of the primary content differs from the screen size and/or aspect ratio of the display device used to display the primary content, then the primary content may fit within a subset of the screen of that display device (e.g., with or without resizing or scaling the primary content because of the differences in sizes and/or aspect ratios) such that a portion(s) of the screen is not occupied or filled by the primary content and is thus available to display other content, such as the secondary content. In other words, if the size and/or aspect ratio of the screen differs from that of the primary content, such differences between the screen and the primary content can result in the primary content having a smaller width and/or height than the screen, thus leaving an unoccupied/unfilled display area(s) of the screen available to display other content, such as the secondary content.

In such cases, the content placement system 128 can designate the unused/available area(s)/portion(s) of the screen as an ROI for placing and displaying the secondary content. Accordingly, the secondary content data 340 from the content placement system 128 can identify such display area(s)/region(s) as an ROI and indicate to the media device(s) 106 that such ROI can be used to display the secondary content without interfering with, interrupting, and/or otherwise obstructing/obfuscating the primary content (or any portion thereof). Based on that information in the secondary content data 340, the media device(s) 106 can use the unused/available portion(s) of the screen identified as the ROI to display a secondary content item such as, for example, an advertisement, a logo, closed captions or subtitles generated from speech in the primary and/or secondary content, a depiction of sign language conveying information from the speech in the primary and/or secondary content, and/or any other secondary content item.

In some cases, the size and/or aspect ratio of the primary content can be adjusted to fit within a smaller portion of the screen of a display device so the screen can be used to display the adjusted primary content while leaving a portion(s) of the screen unoccupied/unfilled by the adjusted primary content and available to display other content, such as secondary content (or a portion thereof). For example, assume that, in FIG. 3, the display device(s) 108 is used to (or selected to) display the primary content, and the size and/or aspect ratio of the primary content matches (or exceeds) the size and/or aspect ratio of the screen of the display device(s) 108. In this example, the size and/or aspect ratio of the primary content can be reduced to such that a height and/or width of the adjusted primary content is smaller than the height and/or width of the screen of the display device(s) 108, thereby creating extra display space within the screen on which the secondary content (or a portion thereof) can be displayed without interfering with the adjusted primary content displayed at the screen. Such extra display space can include a region(s) of the screen that is not occupied or filled by the adjusted primary content, and can be designated as an ROI for displaying the secondary content (or a portion thereof). Consequently, the media device(s) 106 can use such ROI within the screen to display the secondary content (or the portion thereof) without interfering with, interrupting, or blocking/obfuscating any portion of the primary content displayed on the remaining portion(s) of the screen.

Non-limiting examples of ROIs within a screen of a display, such as ROIs identified based on a difference between sizes and/or aspect ratios of the primary content and the screen used (or selected) to display the primary content, are illustrated in FIGS. 4A through 4D and further described below with respect to those figures.

In some cases, the placement, adjustment, and/or processing of secondary content can be performed during a live content session. For example, secondary content can be inserted into live content (e.g., into an ROI within the live content) rendered by the media device(s) 106. The placement location of the secondary content can be determined live (e.g., while the media device(s) 106 renders the live content) or can be predetermined prior to the rendering of the live content. Such placement location can be determined at the edge/client (e.g., at the media device(s) 106) or on the backend/cloud (e.g., at the content placement system(s) 128). Similarly, any saliency estimation, adjustment (e.g., aspect ratio changes, etc.) of the secondary content being inserted into the live content, and/or adjustment of the live content to accommodate the insertion of the secondary content can be performed live or prior to the rendering of the live content, and can be performed at the edge/client (e.g., at the media device(s) 106) or on the backend/cloud (e.g., at the content placement system(s) 128).

In some cases, the backend/cloud (e.g., the content placement system(s) 128) can process the primary content and/or the secondary content before presentation at the edge/client (e.g., at the media device(s) 106). In such cases, the backend/cloud (e.g., the content placement system(s) 128) can optionally build a spatiotemporal map of regions within a screen and/or primary content where the secondary content can be inserted. In some aspects, the backend/cloud can stream to the media device(s) 106 a version of the primary content that has been strategically retargeted/adjusted to allow space for the secondary content. Such an approach can allow for personalization at the edge/client (e.g., media device(s) 106) with less use of local compute resources at the edge/client and without (or with less) computational complexity at the edge/client. In some aspects, such an approach can be implemented on live content rendered at the edge/client, with some added latency/buffer to allow for processing and rendering of content at the edge/client.

As previously noted, the content placement system 128 and the media device(s) 106 can leverage any display device in the user environment 310 to display any secondary content, including display devices concurrently/simultaneously used to display primary content and/or any other display device. In an illustrative example, assume that the display 324 represents a smartwatch (or any other mobile device such as a mobile phone or a tablet computer), the primary content is a movie, and the display device(s) 108 is selected (and/or used) to display the movie. In this example, as the display device(s) 108 displays the movie, the smartwatch (e.g., display 324) can display closed captions or subtitles for the movie. Here, the closed captions or subtitles can represent secondary content, and can be displayed at the smartwatch without interfering with or blocking any portion of the movie. In some cases, the user(s) 132 may even be able to scroll or rewind through the closed captions or subtitles displayed on the smartwatch without interrupting with the movie playing on the display device(s) 106. For example, the user(s) 132 may use the smartwatch to scroll to a previous portion of the closed caption or subtitles corresponding to speech from an earlier scene in the movie without also having to rewind the movie.

In another illustrative example, if there are any interruptions in the primary content displayed at a display device, during the interruption, the media device(s) 106 can display secondary content within a portion of the screen of the display device used for the primary content. For example, assume that the media device(s) 106 initiates a trick mode while the user(s) 132 rewinds or fast-forwards the primary content displayed at the display device(s) 108. During the trick mode, the display device(s) 108 can stop displaying the primary content on the screen and instead display a visual rewind or fast-forward effect with visual feedback indicating the current playback position within the primary content such as thumbnails generated from or representing certain video frames of the primary content, which can visually indicate to the user(s) 132 the current rewound or fast-forwarded position within the primary content. The visual rewind or fast-forward effect and the visual feedback of the trick mode (e.g., the thumbnails) may only use a portion of the screen of the display device(s) 108, leaving the remaining portion of the screen previously used to display the primary content available (e.g., unused by the primary content).

Accordingly, in this example, since the display device(s) 108 has stopped displaying the primary content during the rewinding or fast-forwarding and the visual information provided by the trick mode does not use the entire screen of the display device(s) 108, the media device(s) 106 can display the secondary content within the remaining portion of the screen that was previously used to display the primary content and has become available (e.g., unused) during the trick mode and associated rewinding or fast-forwarding. This way, the display device(s) 108 can be used to display the secondary content during the rewinding or fast-forwarding of the primary content, without interfering with, interrupting, or otherwise blocking any portion of the primary content (e.g., as the primary content is already interrupted for the rewinding or fast-forwarding). When the user(s) 132 stops rewinding or fast-forwarding the primary content and resumes playback of the primary content, the portion of the screen used to display the secondary content can switch from presenting the secondary content to presenting the primary content again.

In yet another illustrative example, the media device(s) 106 can use a picture-in-picture (PIP) feature to simultaneously display primary content and secondary content at the display device(s) 108 (and/or any other device). For example, the display device(s) 108 can display the primary content within a main window on the screen of the display device(s) 108 and the secondary content within a smaller window on the screen of the display device(s) 108, such as a smaller, floating window. In some cases, the smaller window used to display the secondary content can be placed within an ROI on the screen of the display device(s) 108 to reduce/limit or mitigate any interference with the primary content caused by the smaller window displaying the secondary content. The ROI can be determined based on any of the techniques described herein. For example, the ROI can be determined based on an attention level of the user(s) 132 such that the region of the screen selected as the ROI can be a region that the user(s) 132 is not focused on (or is less/least focused on relative to other regions of the screen) as determined from the attention level information. As another example, the ROI can be determined based on saliency scores calculated for regions of the screen displaying the primary content, such as a region having the lowest saliency score or a saliency score below a threshold.

In some cases, the user(s) 132 can provide an input via the media device(s) 106 and/or the display device(s) 108 (e.g., if the display device(s) 108 includes a touch screen or a sensor that can be used for gesture detection) identifying a display that the user(s) 132 prefers for the secondary content to be displayed. The content placement system 128 can use such input to select the display to be used to display the secondary content. In some cases, the input from the user(s) 132 can identify a region within a display used to display the primary content, on which the user(s) 132 wants the secondary content to be displayed. For example, the user input can specify that a portion of primary content is of less interest to the user(s) 132, and the content placement system 128 can identify a display region corresponding to that portion of the primary content and include that display region as an ROI that can be used to display secondary content. As another example, the user input can specify that a display region used to display a portion of the primary content can be used to display secondary content (e.g., because a portion of primary content displayed on that display region is of less interest to the user(s) 132), and the content placement system 128 can thus select that display region as the ROI or part of the ROI to be used to display secondary content.

In some aspects, the user input can specify what secondary content the user(s) 132 prefers to receive, and the content placement system 128 can use the user input to select such secondary content for presentation to the user(s) 132 as described herein. In some examples, the user input can additionally or alternatively select a particular secondary content provider preferred by the user(s) 132. In such examples, the secondary content provided to the user(s) 132 can include or be limited to content from or associated with the selected secondary content provider.

Figure 4B:
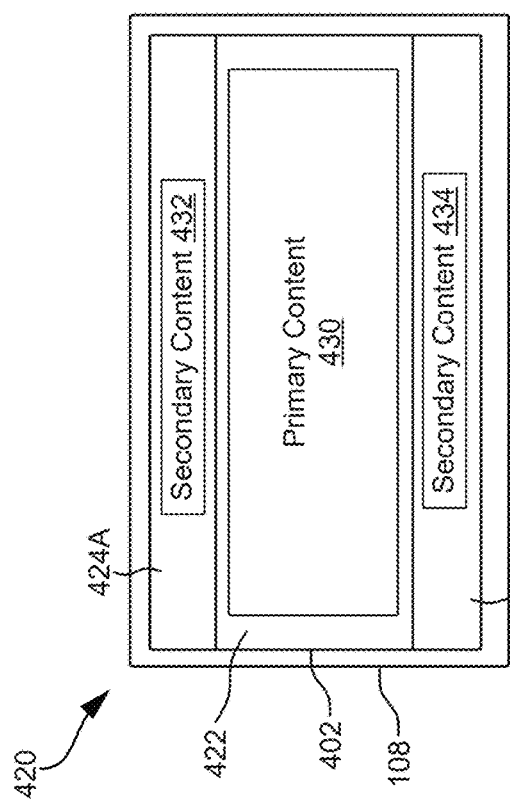
FIGS. 4A through 4C illustrate example arrangements of content within different display regions of a screen of a display device, according to some examples of the present disclosure.
Figure 4D:
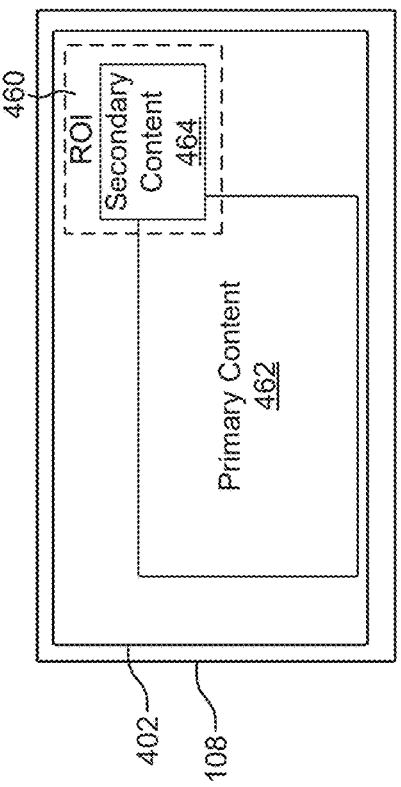
FIG. 4D illustrates an example configuration of a screen that includes a region-of-interest used to display secondary content concurrently with primary content displayed on the screen, according to some examples of the present disclosure.
Figure 4A:
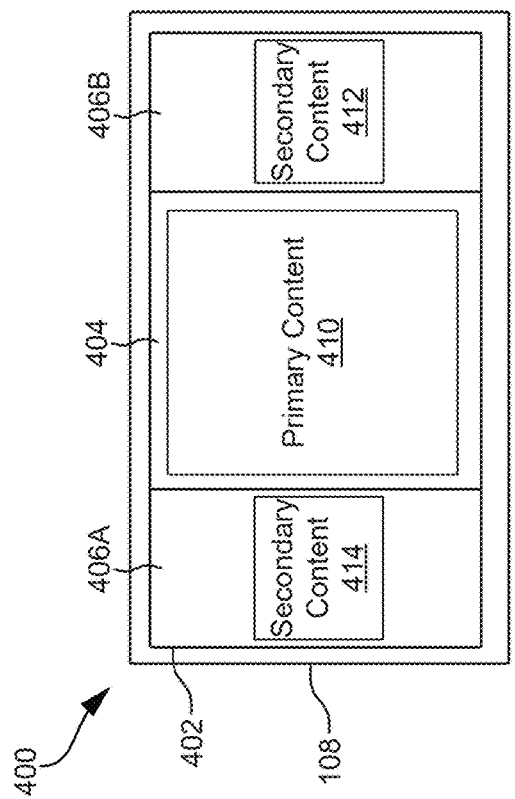

FIG. 4A illustrates an example arrangement 400 of content within different display regions of a screen 402 of the display device(s) 108, according to some examples of the present disclosure. In this example, the screen 402 includes a display region 404 representing the main display region used to display the primary content 410, and extra display regions 406A and 406B used to display secondary content 412 and 414. The extra display regions 406A and 406B of the screen 402 represent portions of the screen 402 that are not occupied or filled by the primary content 410 because the display width of the screen 402 is greater than the width of the primary content 410. In some examples, the difference between the display width of the screen 402 and the width of the primary content 410 can result from a mismatch between the aspect ratio of the screen 402 and the aspect ratio of the primary content 410. For example, if the screen 402 has a wider aspect ratio than the primary content 410, the primary content 410 may have a smaller width than the screen 402 and thus may not occupy or fill the entire display width of the screen 402 when displayed at the display device(s) 108. Accordingly, when the primary content 410 is displayed on the screen 402, the screen 402 may display the vertical columns or bars (e.g., often depicted in black) represented by the extra display regions 406A and 406B, which may be added to fill the screen 402 along the horizontal dimension (e.g., and/or added to the primary content 410 to fill the screen 402 as previously noted).

For example, if the screen 402 is a wide screen with a 21:9 aspect ratio and the primary content 410 has a smaller aspect ratio, such as 4:3 or 16:9, the primary content 410 will fit within a subset of the screen 402 and the screen 402 will have extra display spaces which in this example are shown as vertical bars or columns that extend from each side of the primary content 410 (or the display region 404 used to display the primary content 410) to the edge of the screen 402 on each side. As another example, if the aspect ratios of the primary content 410 and the screen 402 do not match and the primary content 410 does not fit within the aspect ratio of the screen 402, the primary content 410 may be proportionally downsized or scaled to better fit within the screen 402 without distortions. In some cases, the resizing/scaling of the primary content 410 may reduce the width of the primary content relative to the width of the screen 402 such that the adjusted primary content may not fill or occupy the entire screen 402 along the horizontal dimension, resulting in the extra display regions 406A and 406B represented by vertical columns or bars on each side of the display region 404 and the primary content 410.

Because the primary content 410 does not fill or occupy the extra display regions 406A and 406B of the screen 402, the display device(s) 108 can use any of the extra display regions 406A and 406B to display other content, such as secondary content, without blocking/obstructing/obfuscating, interrupting, or interfering with the primary content 410. For example, in FIG. 4A, the extra display regions 406A and 406B of the screen 402 are used to display secondary content 412 and 414, which are displayed on the screen 402 in addition to the primary content 410 displayed on the display region 404.

The secondary content 412 and 414 can include any type of content, such as image content, video content, text content, graphics content, and/or any other visual content. The term "secondary" is not intended to limit the scope of content of the secondary content 412 and 414 to any particular type of visual content, but is rather used to disambiguate/distinguish between the primary content and the secondary content. In an illustrative example, the secondary content 414 can include or represent a logo or advertisement displayed concurrently with the primary content 410, and the secondary content 414 can include or represent text displayed concurrently with the primary content 410. The text can include any text. For example, in some cases, the text can include closed captions or subtitles generated from speech associated with the primary content 410. In some cases, the text can additionally include other text such as a message included with the closed captions or subtitles. To illustrate, in addition to closed captions or subtitles, the text can include a message identifying a sponsor of the closed captions or subtitles, such as a messaging stating that the closed captions or subtitles are brought to you by a specific sponsor of the closed captions or subtitles.

While FIG. 4A shows secondary content displayed on both of the extra display regions 406A and 406B of the screen 402, in other examples, the secondary content may be depicted in one of the extra display regions 406A and 406B of the screen 402. Moreover, while FIG. 4A illustrates two secondary content items (e.g., secondary content 412 and 414) displayed on the screen 402, in other examples, the screen 402 may display (e.g., via the extra display region 406A and/or the extra display region 406B) more or less secondary content items than shown in FIG. 4A. Also, while FIG. 4A illustrates two extra display regions (e.g., extra display regions 406A and 406B) depicted as vertical columns or bars on each side of the display region 404 and the primary content 410, in other examples, the screen 402 may include more or less extra display regions in the same or different arrangement (e.g., vertical columns or bars, horizontal rows or bars, etc.), as shown for example in FIGS. 4B through 4C.

FIG. 4B illustrates another example arrangement 420 of content within different display regions of the screen 402 of the display device(s) 108, according to some examples of the present disclosure. In this example, the screen 402 includes display region 422 representing the main display region used to display primary content 430, and extra display regions 424A and 424B used to display secondary content 432 and 434. In this example, the extra display regions 424A and 424B of the screen 402 represent portions of the screen 402 that are not occupied or filled by the primary content 430 because the display height of the screen 402 is greater than the height of the primary content 430. As shown, in some cases, when the primary content 430 is displayed on the screen 402, the screen 402 may display the horizontal rows or bars (e.g., often depicted in black) represented by the extra display regions 424A and 424B, which may be added to adjust the primary content 430 to fit within the screen 402 (including along the vertical dimension).

The difference between the display height of the screen 402 and the height of the primary content 430 can result from a mismatch between the aspect ratio of the screen 402 and the aspect ratio of the primary content 430. For example, if the primary content 430 has a wider aspect ratio than the screen 402, the primary content 430 may have a smaller height than the screen 402 and thus may not occupy or fill the entire display height of the screen 402 when displayed at the display device(s) 108. In some cases, the primary content 430 may have the smaller height than the screen 402 because the original primary content is larger than the screen 402 (e.g., because of a mismatch between the aspect ratios of the screen 402 and the original primary content) and, prior to being displayed on the screen 402, the primary content 430 may be proportionally downsized or scaled to better fit within the screen 402 without distortions. Here, the resizing/scaling of the primary content may reduce the height of the primary content relative to the height of the screen 402 such that the adjusted primary content may not fill or occupy the entire screen 402 along the vertical dimension, resulting in the extra display regions 424A and 424B represented by horizontal rows or bars above and below the display region 422 and the primary content 430 displayed on the display region 422.

Because the primary content 430 does not fill or occupy the extra display regions 424A and 424B of the screen 402, the display device(s) 108 can use any of the extra display regions 424A and 424B to display other content, such as secondary content, without blocking/obstructing/obfuscating, interrupting, or interfering with the primary content 430. In the example shown in FIG. 4B, the extra display regions 424A and 424B of the screen 402 are used to display secondary content 432 and 434. The secondary content 432 and 434 can include any type of content, such as image content, video content, text content, graphics content, and/or any other visual content, as previously explained. While FIG. 4B shows secondary content displayed on both of the extra display regions 424A and 424B of the screen 402, in other examples, the secondary content may be displayed in one of the extra display regions 424A and 424B of the screen 402. Moreover, while FIG. 4B illustrates two secondary content items displayed on the screen 402, in other examples, the screen 402 may display (e.g., via the extra display region 424A and/or the extra display region 424B) more or less secondary content items than shown in FIG. 4B.

Figure 4C:
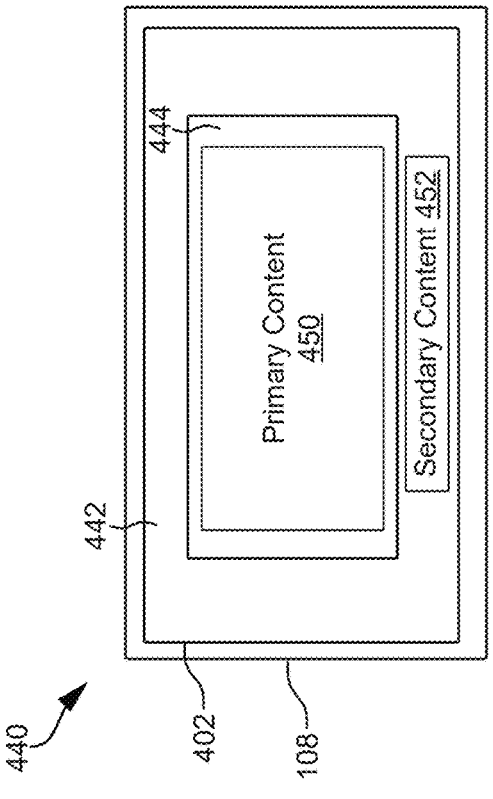

FIG. 4C illustrates another example arrangement 440 of content within different display regions of the screen 402 of the display device(s) 108, according to some examples of the present disclosure. In this example, the screen 402 includes a display region 442 that includes a smaller display region 444 representing the main display region used to display primary content 450. As shown, the height and width of the primary content 450 and the display region 444 used to display the primary content 450 are smaller than the height and width of the display region 442 of the screen 402, resulting in portions of the display region 442 around the edges of the display region 444 and the primary content 450 that are unoccupied/unfilled by the primary content 450 (e.g., unused to display the primary content 450) and thus available to display other content, such as secondary content.

Thus, in this example, the secondary content 452 can be displayed on any portion of the display region 442 that is outside of the primary content 450 and the display region 444 used to display the primary content 450. By using any portion of the display region 442 that is outside of the primary content 450 and the display region 444 used to display the primary content 450, the secondary content 452 can be displayed on the screen 402 in addition to the primary content 450 without interfering with, interrupting, or blocking/obfuscating the primary content 450 displayed at the screen 402. For example, while the primary content 450 is displayed on the display region 444 of the screen 402, the screen 402 can also display closed captions or subtitles for the primary content 450 to supplement the primary content 450. Here, the closed captions or subtitles can be displayed on any portion of the display region 442 that is outside of the primary content 450 and the display region 444 used to display the primary content 450, so the closed captions or subtitles do not block or interfere with the primary content 450.

In some cases, other secondary content, such as an advertisement or promotional content, can also be displayed on any portion of the display region 442 that is outside of the primary content 450 and the display region 444 used to display the primary content 450. For example, in addition to display the closed captions or subtitles, the screen 402 can display a logo of a sponsor/provider of the closed captions or subtitles and/or a message attributing the closed captions or subtitles to the sponsor/provider, such as a message stating that the closed captions or subtitles are provided by a particular sponsor/provider. The logo and/or the message can similarly be displayed on any portion of the display region 442 that is outside of the primary content 450 and the display region 444 used to display the primary content 450, so the logo and/or message displayed does/do not interfere with or block/obfuscate any portion of the primary content 450.

The secondary content 452 can include any type of content, such as image content, video content, text content, graphics content, and/or any other visual content, as previously explained. While FIG. 4C illustrates one secondary content item displayed on the screen 402, in other examples, the screen 402 may display (e.g., via any portion of the display region 442 that is outside of the primary content 450 and the display region 444 used to display the primary content 450) more secondary content items than shown in FIG. 4C.

FIG. 4D illustrates an example configuration of the screen 402 that includes an ROI 460 used to display secondary content 464 concurrently with primary content 462 displayed on the screen 402, according to some examples of the present disclosure. The ROI 460 can include a region of the screen 402 that is not occupied or used by the primary content 462 and/or a region of the screen 402 displaying a portion of the primary content 462 that has a saliency score that is below a threshold.

For example, in some cases, the content placement system 128 can determine whether the screen 402 includes any display regions that are not occupied or used by the primary content 462. If the content placement system 128 identifies a display region of the screen 402 that is not occupied or used by the primary content 462, the content placement system 128 can select that display region as the ROI 460 that can be used to display the secondary content 464. In some cases, if the content placement system 128 determines that the secondary content 464 does not fit within that display region, the content placement system 128 may determine whether any surrounding display region can also be designated as part of the ROI 460 and used to display any portion of the secondary content 464.

To illustrate, the content placement system 128 may identify any surrounding display region that extends the size of the display region to fit the secondary content 464. The content placement system 128 can include such surrounding display region as part of the ROI 460. In some cases, the content placement system 128 can first determine whether the surrounding display region is needed or used to display any portion of the primary content 462. If the surrounding display region is needed or used to display any portion of the primary content 462, it means that using such display region as part of the ROI 460 to display secondary content 464 may cause the portion of the primary content 462 in that display region to be blocked or obfuscated by a portion of the secondary content 464 if such display region is included as part of the ROI 460. Accordingly, in some cases, the content placement system 128 may determine whether a saliency score of the surrounding display region is below a saliency threshold, and include such display region as part of the ROI 460 used to display the secondary content 464 if the associated saliency score is below the threshold. This way, the content placement system 128 can limit the obstruction, inconvenience, and/or interruption to the user that may result from using such display region occupied by a portion of the primary content 462 as part of the ROI 460.

For example, if the surrounding display region is used to display a portion of the primary content 462 that has a lower degree of importance or relevance to the user (and/or the rest of the primary content 462) than other portions of the primary content 462, such as a portion of a background of the primary content 462, the surrounding display region may be assigned a lower saliency score (e.g., below a threshold saliency) than the other portions of the primary content 462. If the lower saliency score is below a threshold saliency, it can indicate or mean that the viewing experience of the user would be less negatively affected if that portion of the primary content 462 is blocked or occluded by a portion of the secondary content 464 displayed in that surrounding display region (e.g., if that surrounding display region is included as part of the ROI 460 and thus used to display the secondary content 464), than if the other portions of the primary content 462 having higher saliency scores are included as part of the ROI 460 and thus used to display any portion of secondary content that may block or occlude that other portions of the primary content 462. Therefore, if the portion of the primary content 462 corresponding to the surrounding display region has a saliency score below a threshold, the surrounding display region used to display that portion of the primary content 462 may be included in the ROI 460 and used to display the secondary content 464 (or a portion thereof) even though it may block or obfuscate/occlude that portion of the primary content 462, as blocking or obfuscating/occluding that portion of the primary content 462 may not negatively impact the viewing experience of the user (or may have an acceptable negative impact), as indicated or suggested by the lower saliency score of that portion of the primary content 462.

As previously noted, any saliency estimation algorithm or technique can be used to determine saliency scores of portions of the primary content 462, such as static saliency, motion saliency, objectness, etc. In some cases, the saliency estimation can be performed using an AI/ML model configured to perform saliency estimation, such as a neural network model for saliency estimation. In other cases, the saliency estimation can be performed using a classic saliency estimation algorithm.

In some examples, the ROI 460 can be identified based on an attention level of the user. For example, the content placement system 128 can use image data depicting a face and/or eyes of the user associated with the screen 402, to detect or estimate an attention level of the user. The content placement system 128 can use this information to determine what portions of the primary content 462 (and/or the screen 402) the user is more/most focused on, and identify any region of the screen 402 that the user is less/least focused on. The content placement system 128 can then select the ROI 460 based on the region(s) of the screen 402 that the user is less/least focused on and/or is less/least interested in.

Figure 5:
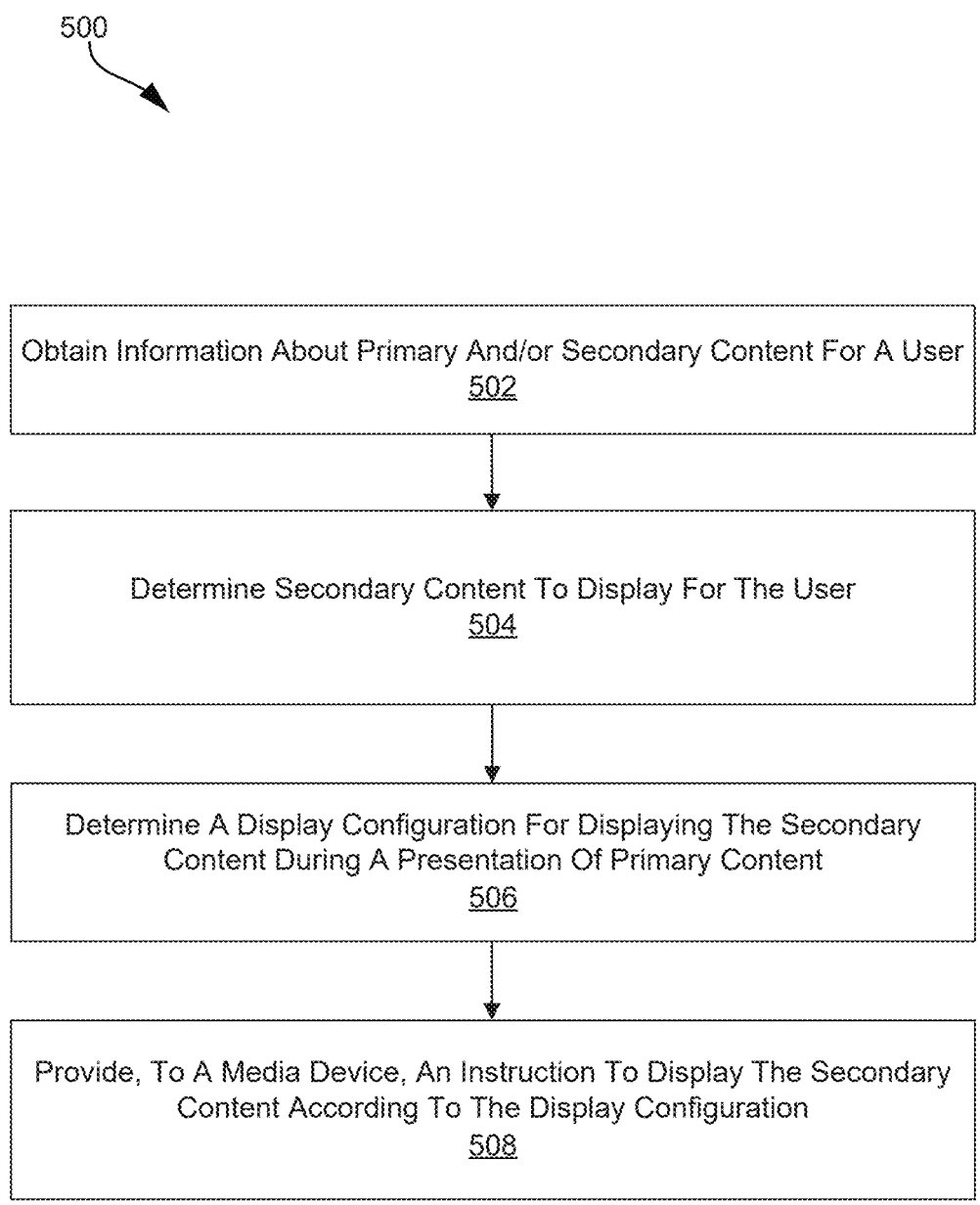
FIGS. 5 through 7 are flowcharts illustrating example methods for determining a configuration of secondary content for presentation to a user, according to some examples of the present disclosure.

FIG. 5 is a flowchart illustrating an example method 500 for determining a configuration of secondary content for presentation to a user, according to some examples of the present disclosure. The method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 500. Further, some of the steps may be performed simultaneously, or in a different order than shown in FIG. 5, as will be understood by a person of ordinary skill in the art. Method 500 shall be described with reference to FIG. 3. However, method 500 is not limited to that example.

At step 502, the content placement system 128 can obtain, from media device(s) 106, information about content for the user(s) 132 associated with the media device(s) 106, such as primary and/or secondary content selected by the user(s) 132, accessed or requested by the user(s) 132, displayed at the display device(s) 108 associated with the user(s) 132, to be displayed at the display device(s) 108, etc. In some examples, the information can identify primary content requested by the user(s) 132, displayed/accessed or to be displayed at the display device(s) 108, etc. In some examples, if the primary content has already been selected/displayed for the user(s) 132, the information can provide information about the primary content, such as associated metadata, content details, etc. In other examples, if the primary content has not already been selected, determined, and/or displayed for the user(s) 132, the information can include any information that can be used to select the primary content such as, for example, user preferences, content preferences, content restrictions, content requirements, content providers/sources, content categories, content titles, content genres, content ratings/rankings, etc.

In some cases, the information from the media device(s) 106 can include other information (e.g., device data 330) such as, for example and without limitation, the user(s) 132, the media device(s) 106 associated with the user(s) 132, the user environment 310 associated with the user(s) 132 and the media device(s) 106, the display device(s) 108 associated with the user(s) 132, an input from the user(s) 132, and/or any other information. In some examples, the content placement system 128 can use the information from the media device(s) 106 to select the primary content and/or secondary content for the user(s) 132, determine a configuration and/or display setting of/for the primary content and/or secondary content, determine when and/or where to display the primary content and/or the secondary content for the user, determine what devices are available in the user environment 310 to process and/or display content, etc.

At step 504, the content placement system 128 can determine secondary content to display for the user(s) 132. The content placement system 128 can select the secondary content for display with or along with the primary content, in addition to the primary content, concurrently with the primary content, during a playback of the primary content, during a content session that includes the primary content, as part of and/or in relation to a presentation of the primary content, during a break in a playback of the primary content, etc. For example, in some cases, the secondary content can be integrated with the primary content, supplementary to the primary content, related to the primary content, relevant to the primary content, separate or independent from the primary content, etc. In some cases, the content placement system 128 can select the secondary content for presentation to the user(s) 132 at a time when the user(s) 132 is present in a scene (e.g., the user environment 310) where the display device(s) used to present the secondary content is located and/or when the user(s) 132 is facing or paying attention to the display device(s) used to display the secondary content. In some examples, the content placement system 128 can determine whether the user(s) 132 is present in the environment based on speech from the user(s) 132, a location of a mobile device of the user(s) 132 (e.g., obtained with the consent of the user(s) 132), a Bluetooth tag associated with the user(s) 132, an input from the user(s) 132, a profile of the user(s) 132, an Internet Service Provider (ISP) of the user(s) 132, etc. In other examples, the content placement system 128 can additionally or alternatively determine whether the user(s) 132 is facing or paying attention to a certain display (and/or displayed content) based on data obtained from one or more sensors, such as image data depicting the user(s) 132 (or a face or portion of the face of the user(s) 132) obtained from an image/camera sensor (e.g., with the consent of the user(s) 132 and/or requested by the user(s) 132).

In some examples, the content placement system 128 can select the secondary content from a pool of content at the content server(s) 120 (and/or any other source). The content placement system 128 can instruct the content server(s) 120 to provide the secondary content to the media device(s) 106 associated with the user(s) 132, or can obtain the secondary content from the content server(s) 120 and provide the secondary content from the content server(s) 120 to the media device(s) 106 associated with the user(s) 132. If the content placement system 128 obtains the secondary content from the content server(s) 120, the content placement system 128 can deliver the secondary content to the media device(s) 106 (e.g., as opposed to or in addition to the content server(s) 120 delivering the secondary content to the media device(s) 106) and/or can analyze the secondary content to determine information about the secondary content and/or a configuration for displaying the secondary content to the user(s) 132, as further described herein. The configuration for displaying the secondary content can include, for example and without limitation, where to display the secondary content, how to display the secondary content, when to display the secondary content, how to process and/or preprocess the secondary content before display to the user(s) 132, etc.

In some examples, the content placement system 128 can determine what characteristics the selected secondary content should have such as, for example and without limitation, a size (e.g., a storage size, an image or pixel height and/or width of the secondary content, an aspect ratio of the secondary content, etc.), a type of content of the secondary content (e.g., a live video, a pre-recorded or on-demand video, an image, graphics, an animated video, a video game, a movie, a video clip, a TV show, etc.), a digital format of the secondary content, a content category of the secondary content, a language of the secondary content, a genre of the secondary content, visual effects associated with the secondary content, a resolution of the secondary content, a scale or scaling settings of the secondary content, a frame rate of the secondary content, color settings of the secondary content, type of graphics in the secondary content, a video component(s) of the secondary content, an audio component of the secondary content, a text component of the secondary content, encoding settings, a video frame size, a bit depth, a transparency, color channel information (e.g., red (R), green (G), blue (B) channels and/or values, etc.), interpolation, motion, a duration or length, a rating, metadata, etc. For example, the content placement system 128 can determine a type of content of the secondary content, a digital format of the secondary content, a provider or source of the secondary content, a genre of the secondary content, a parameter of the secondary content (e.g., a duration, a resolution, an aspect ratio, a frame rate, a quality, a size, etc.), a category of content associated with the primary content, a relationship to the primary content, a purpose or goal for displaying the secondary content to the user(s) 132, information to be conveyed to the user(s) 132 through the secondary content, etc.

The content placement system 128 can use such information to select the secondary content for the user(s) 132, instruct a source of the secondary content (e.g., content server(s) 120) to deliver the secondary content to the media device(s) 106 associated with the user(s) 132, and/or determine a configuration for presenting the secondary content, as further described herein. For example, if the information obtained from the media device(s) 106 (e.g., the information about content for the user(s) 132 and any other information) indicates that the user(s) 132 wants secondary content from a specific provider(s)/source(s), the content placement system 128 can specify that the secondary content should be limited to content from that specific provider(s)/source(s), limit the pool of content from which the secondary content is selected to content from that specific provider(s)/source(s), and/or select the secondary content for the user(s) 132 from content associated with the specific provider(s)/source(s).

As another example, if the content placement system 128 determines, based on the information, that the secondary content should include audio-related text data (e.g., closed captions and/or subtitles) and information attributing or crediting the provisioning of the audio-related text data to a particular provider/source, the content placement system 128 can obtain or generate audio-related text data associated with the primary content for display to the user(s) 132 when the user accesses (e.g., plays, watches, etc.) primary content (and/or during a presentation of the primary content), along with a message attributing the audio-related text data provided with the primary content to a particular provider/source (e.g., the closed captions or subtitles are brought to you by Company XYZ). In some examples, the content placement system 128 can obtain the audio-related text data associated with the primary content from another source, such as the content server(s) 120, the Internet, a remote network, etc. In other examples, the content placement system 128 can generate the audio-related text data based on an audio of the primary content. For example, the content placement system 128 can use an algorithm or model configured to transcribe audio/speech (e.g., via speech-to-text, speech recognition, audio transcription, etc.) in content (e.g., the primary content), such as an AI/ML model configured to perform speech recognition/transcription. The algorithm or model can process the audio in the primary content to generate the audio-related text data associated with the primary content.

As yet another example, if the content placement system 128 determines, based on the information, that the user(s) 132 may benefit from visual depictions of sign language corresponding to speech in the primary content (e.g., because a speaker device does not work or is unavailable, because an ability of the user(s) 132 to hear is impaired, because the user(s) 132 prefers to play an audio of the primary content below a certain level, etc.), the content placement system 128 can generate image data depicting sign language gestures that convey any information from speech included in the primary content. The content placement system 128 can select the image data depicting the sign language as the secondary content (or as part of the secondary content) for the user(s) 132. In some examples, the content placement system 128 may determine to use the sign language depictions as the secondary content or include them as part of the secondary content based on an input from the user(s) 132, a user profile, a user preference, device information (e.g., which can indicate audio capabilities of devices in the user environment 310, a volume set for a speaker(s) in the user environment 310, and/or other relevant information), or other information.

At step 506, the content placement system 128 can determine a display configuration for displaying the secondary content during a presentation of the primary content (and/or a session associated with the primary content). In some examples, the content placement system 128 can determine a display configuration that prevents or reduces any disruptions to or interruptions of a playback or presentation of the primary content caused by the secondary content, does not interfere with the user(s) 132 viewing the primary content (or an ability of the user(s) 132 to view the primary content), prevents or reduces distractions to the user(s) 132 by the secondary content when the user(s) 132 is consuming the primary content, and/or that does not (or reduces) block/obfuscate the primary content or inconvenience the user(s) 132 when trying to consume the primary content.

In some aspects, the display configuration can include, for example, where the secondary content is or should be displayed (e.g., which display device is used to display the secondary content), a placement of the secondary content within a display area of the display device (e.g., display device(s) 108) used to display the secondary content, a display resolution, rendering settings, a display mode (e.g., playback mode, trick mode or trick play, fast-forward mode, rewind mode, static mode, etc.), layout settings, screen settings, a display scale, a video bitrate, color settings, a presentation mode (e.g., mirrored display, extended display, etc.), playback settings, a frame rate, and/or any other display configuration details or settings.

For example, the display configuration can define or specify which display device to use to display the secondary content, a placement/positioning of the secondary content within a display or display region (e.g., within a window used to display the primary content, within a different window such as a PIP window, within a screen/display used to display the primary content, within a different screen/ display, within an ROI selected for the secondary content, etc.), any presentation settings for the secondary content (e.g., a static presentation, a dynamic or animated presentation of the secondary content, a motion depicted in the presentation of the secondary content, etc.), the type and/or format of the secondary content (e.g., audio content, video content, image content, text such as audio-related text (e.g., closed captions and/or subtitles) and/or any other text, graphics, thumbnails, animated video, video clips, advertisements content, logos, visual representations of speech such as sign language visualizations/depictions, etc.), etc.

In some cases, the display configuration can define an ROI within the primary content (and/or within a display used to display the primary content) where the secondary content should be placed/displayed. For example, the ROI can specify a portion of the primary content (e.g., specific data blocks, blocks of pixels, pixel coordinates, segments of the primary content, etc.) on which to place (e.g., overlay, etc.) the secondary content or that should be replaced with the secondary content. As another example, the ROI can specify a display region (e.g., x, y, z coordinates of a display region or any other location information identifying a display region) to place/display the secondary content. The display region can include an area within a display used to display the primary content.

In some examples, the display region can include a portion of the display that is not filled/occupied by the primary content (or a portion thereof) or does not include the primary content (or a portion thereof). In other examples, the display region can include a portion of the display that corresponds to (e.g., includes, is filled/occupied by, depicts, is or would be used to display, etc.) a portion of the primary content that has an estimated saliency value that does not exceed (e.g., that is less than or equal to) a saliency threshold. The content placement system 128 can determine saliency values (e.g., a saliency map with saliency values) corresponding to different portions of the primary content using any saliency estimation techniques described herein, and can compare the saliency values to a predetermined threshold saliency value in order to identify a portion of the primary content that has a saliency value that is less than or equal to the predetermined threshold saliency value. Once the content placement system 128 has identified a content portion that has a saliency value that is less than or equal to a threshold saliency value, the content placement system 128 can identify a display region displaying that content portion (or that will display the content portion once the primary content is displayed on the display that includes the display region), and can select that display region as an ROI for placing/displaying the secondary content.

At step 508, the content placement system 128 can provide, to the media device(s) 106, an instruction to display the secondary content according to the display configuration. For example, the content placement system 128 can send an instruction to the media device(s) 106 instructing the media device(s) 106 to display the secondary content at the display 322 (e.g., by coordinating such display with the computing device 320 connected to the display 322), at the display 324, or on a specific display region (e.g., an ROI) of the display device(s) 108. The instruction can provide other details such as a trigger for displaying the secondary content (and/or stop displaying the secondary content), instructions on how to display the secondary content, etc.

In some examples, the content placement system 128 can also send, to the media device(s) 106, the secondary content and/or the primary content. For example, the content placement system 128 can provide, to the media device(s) 106, the secondary content and the instruction to display the secondary content.

Figure 6:
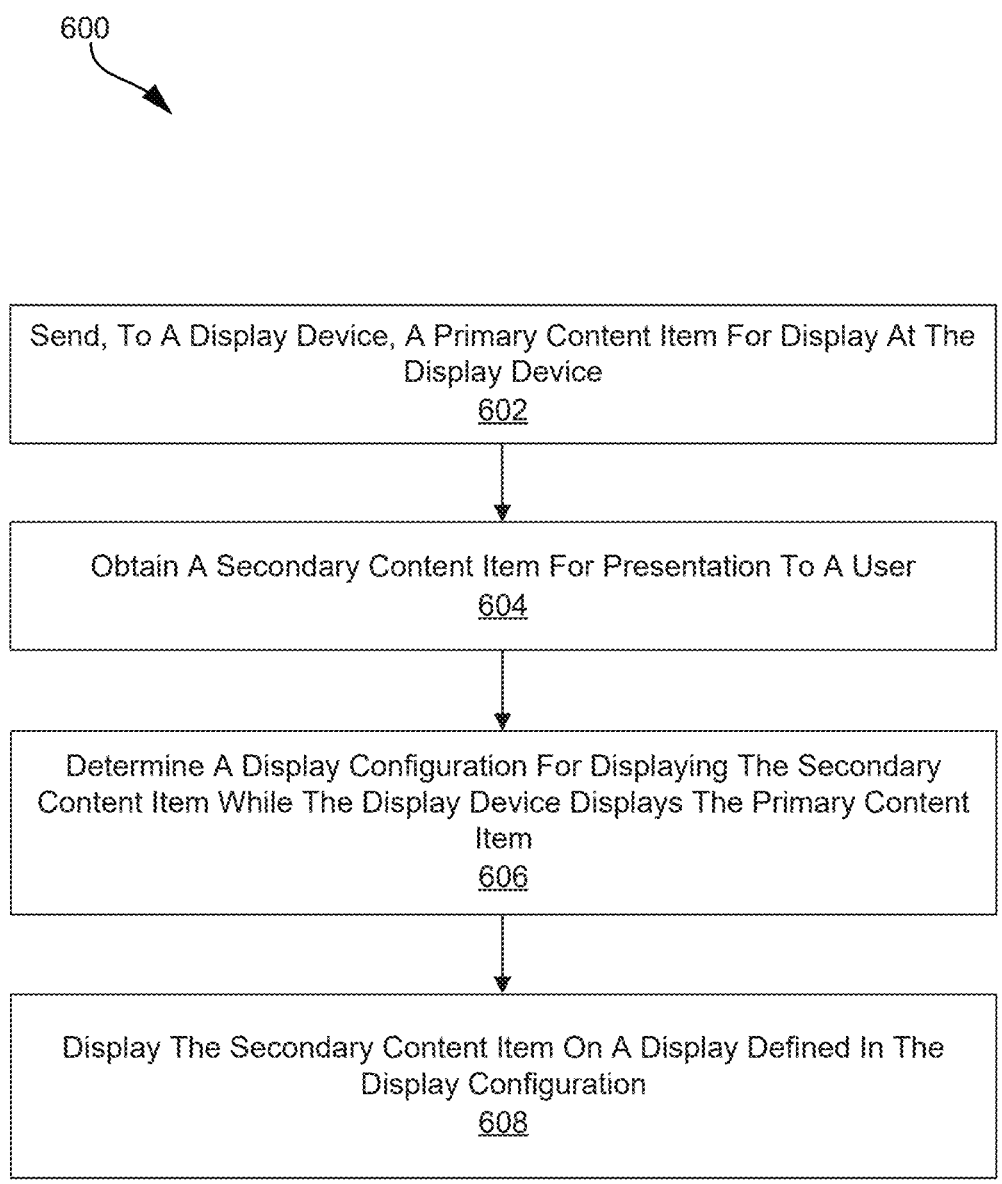

FIG. 6 is a flowchart illustrating another example method 600 for determining a configuration of secondary content for presentation to a user, according to some examples of the present disclosure. The method 600 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 600. Further, some of the steps may be performed simultaneously, or in a different order than shown in FIG. 6, as will be understood by a person of ordinary skill in the art. Method 600 shall be described with reference to FIG. 3. However, method 600 is not limited to that example.

At step 602, the media device(s) 106 can send, to the display device(s) 108, a primary content item for display at the display device(s) 108. In some cases, the media device(s) 106 receive a request from the user(s) 132 to present a primary content item and, in response to the request, send the primary content item to the display device(s) 108 for presentation to the user(s) 132. The media device(s) 106 can obtain the primary content item from a local storage and/or a remote source such as, for example and without limitation, the content server(s) 120, the content placement system 128, the Internet, a network, a cloud-based content system, or any other source.

The primary content item can include, for example and without limitation, a movie, a TV show, an image or set of images, a video (e.g., an animated video, a live video, a pre-recorded or on-demand video, a sequence of video frames, etc.), graphics, text, and/or any other visual content. In some examples, the primary content item can include other media assets such as an audio asset, a text asset, other image/video assets, etc.

At step 604, the media device(s) 106 can obtain a secondary content item for presentation to the user(s) 132. The media device(s) 106 can obtain the secondary content item from local storage and/or a remote source such as, for example and without limitation, the content server(s) 120, the content placement system 128, the Internet, a network, a cloud-based content system, and/or any other source. In some examples, the media device(s) 106 (or the content placement system 128) can select the secondary content item. Moreover, the media device(s) 106 can select (and/or obtain) the secondary content item for display with or along with the primary content item, in addition to the primary content item, concurrently with the primary content item, during a playback of the primary content item, during a content session that includes the primary content item, as part of and/or in relation to the display of the primary content item, during a break in a playback of the primary content item, etc. For example, in some cases, the secondary content item can be integrated with the primary content item, supplementary to the primary content item, related to the primary content item, relevant to the primary content item, separate or independent from the primary content item, etc.

In some examples, the media device(s) 106 can select the secondary content item for presentation to the user(s) 132 at a time when the user(s) 132 is present in a scene (e.g., the user environment 310) where the display device(s) used to present the secondary content item is located and/or when the user(s) 132 is facing or paying attention to the display device(s) used to display the secondary content item. In some examples, the media device(s) 106 can determine whether the user(s) 132 is present in the environment based on speech from the user(s) 132, a location of a mobile device of the user(s) 132 (e.g., obtained with the consent of the user(s) 132), a Bluetooth tag associated with the user(s) 132, a profile of the user(s) 132, an input from the user(s) 132, an ISP of the user(s) 132, etc. In other examples, the media device(s) 106 can additionally or alternatively determine whether the user(s) 132 is facing or paying attention to a certain display (and/or displayed content) based on data obtained from one or more sensors, such as image data depicting the user(s) 132 (or a face or portion of the face of the user(s) 132) obtained from an image/camera sensor (e.g., with the consent of the user(s) 132 and/or requested by the user(s) 132).

In some cases, the media device(s) 106 can select the secondary content item from a pool of content at the content server(s) 120 (and/or any other source). In some cases, the media device(s) 106 can receive an input from the user(s) 132 requesting certain type of secondary content, a specific secondary content item, or a provider/source for the secondary content item. The media device(s) 106 can use the input to then select and provide the secondary content item as described herein.

In some examples, the media device(s) 106 can determine what characteristics the secondary content item to be selected for the user(s) 132 should have such as, for example and without limitation, a size (e.g., a storage size, an image or pixel height and/or width of the secondary content item, an aspect ratio of the secondary content item, etc.), a type of content of the secondary content item (e.g., a live video, a pre-recorded or on-demand video, an image, graphics, an animated video, a video game, a movie, a video clip, a TV show, etc.), a digital format of the secondary content item, a content category of the secondary content item, a language of the secondary content item, a genre of the secondary content item, visual effects associated with the secondary content item, a resolution of the secondary content item, a scale or scaling settings of the secondary content item, a frame rate of the secondary content item, color settings of the secondary content item, type of graphics in the secondary content item, a video component(s) of the secondary content item, an audio component of the secondary content item, a text component of the secondary content item, encoding settings, a video frame size, a bit depth, a transparency, color channel information (e.g., R, G, B channels and/or values, etc.), interpolation, motion, a duration or length, a rating, metadata, etc.

For example, the media device(s) 106 can determine a type of content of the secondary content item, a digital format of the secondary content item, a provider or source of the secondary content item, a genre of the secondary content item, a parameter of the secondary content item (e.g., a duration, a resolution, an aspect ratio, a frame rate, a bit rate, a quality, a size, etc.), a category of content associated with the secondary content item, a relationship of the secondary content item to the primary content item, a purpose or goal for displaying the secondary content item to the user(s) 132, information to be conveyed to the user(s) 132 through the secondary content item, etc. The media device(s) 106 can use such information to select the secondary content item for the user(s) 132, instruct a source of the secondary content item (e.g., content server(s) 120) to deliver the secondary content item for presentation to the user(s) 132, and/or determine a configuration for presenting the secondary content item to the user(s) 132.

As another example, if the media device(s) 106 determines, based on information about the user(s) 132 and/or the primary content item, that the secondary content item should include audio-related text data (e.g., closed captions and/or subtitles), the media device(s) 106 can obtain audio-related text data associated with the primary content item for display to the user(s) 132 (e.g., via a selected display as further described below) along with the primary content item displayed for the user(s) 132 at the display device(s) 108. In some examples, the media device(s) 106 can obtain the audio-related text data associated with the primary content from a remote source, such as the content server(s) 120, the content placement system 128, the Internet, a remote network, etc. In other examples, the media device(s) 106 can generate the audio-related text data based on an audio of the primary content item. For example, the media device(s) 106 can use an algorithm or model configured to transcribe audio/speech (e.g., via speech-to-text, speech recognition, audio transcription, etc.) in content (e.g., the primary content item), such as an AI/ML model configured to perform speech recognition/transcription. The algorithm or model can process the audio in the primary content item to generate the audio-related text data associated with the primary content item.

As yet another example, if the media device(s) 106 determines that the user(s) 132 may benefit from visual depictions of sign language corresponding to speech in the primary content item (e.g., because a speaker device does not work or is unavailable, because an ability of the user(s) 132 to hear is impaired, because the user(s) 132 prefers to play an audio of the primary content item below a certain level, etc.), the media device(s) 106 can generate image data depicting sign language gestures that convey any information from speech included in the primary content item. The media device(s) 106 can include the image data depicting the sign language as the secondary content item (or as part of the secondary content item) for the user(s) 132. In some examples, the media device(s) 106 may determine to use the sign language depictions as the secondary content item or include them as part of the secondary content item based on an input from the user(s) 132, a user profile, a user preference, device information (e.g., which can indicate audio capabilities of devices in the user environment 310, a volume set for a speaker(s) in the user environment 310, and/or other relevant information), or other information.

At step 606, the media device(s) 106 can determine a display configuration for displaying the secondary content item while the display device(s) 108 displays the primary content item (and/or before the user(s) 132 terminates a session associated with the primary content item). In some examples, the media device(s) 106 can determine a display configuration that prevents or reduces any disruptions to or interruptions of a playback or presentation of the primary content item caused by the secondary content item, does not interfere with the user(s) 132 viewing the primary content item (or an ability of the user(s) 132 to view the primary content item), prevents or reduces distractions to the user(s) 132 by the secondary content item when the user(s) 132 is consuming the primary content item, and/or that does not (or reduces) block/obfuscate the primary content item or inconvenience the user(s) 132 when trying to consume the primary content item.

The display configuration for the secondary content item can include, for example and without limitation, where to display the secondary content item, how to display the secondary content item, when to display the secondary content item, how to process and/or preprocess the secondary content item before display to the user(s) 132, etc. For example, the display configuration can specify which display device (e.g., display device(s) 108, display 322, display 324) to use to display the secondary content item, a placement of the secondary content item within a display area of the display device selected/used to display the secondary content item, a display resolution, rendering settings, a display mode (e.g., playback mode, trick mode or trick play, fast-forward mode, rewind mode, static mode, etc.), layout settings, screen settings, a display scale, a video bitrate, color settings, a presentation mode (e.g., mirrored display, extended display, etc.), playback settings, a frame rate, and/or any other display configuration details or settings.

To illustrate, the display configuration can define or specify which display device in the user environment 310 to use to display the secondary content item, a placement/positioning of the secondary content item within the selected display (e.g., within a window used to display the primary content item, within a different window such as a PIP window, within a screen/display used to display the primary content item, within a different screen/display, within an ROI selected for the secondary content item, etc.), any presentation settings for the secondary content item (e.g., a static presentation, a dynamic or animated presentation, a motion depicted in the presentation, etc.), the type and/or format of the secondary content item (e.g., audio content, video content, image content, text such as audio-related text (e.g., closed captions and/or subtitles) and/or any other text, graphics, thumbnails, animated video, video clips, advertisements content, logos, visual representations of speech such as sign language visualizations/depictions, etc.), etc.

In some cases, the display configuration can define an ROI within the primary content item (and/or within a display used to display the primary content item) where the secondary content item should be placed/displayed, as previously described with respect to FIGS. 3 through 5. As previously noted, in some examples, the display configuration can specify a display region on which to place the secondary content item. The display region can include a portion of the display that is not filled/occupied by the primary content item (or a portion thereof) or does not include the primary content item (or a portion thereof). In other examples, the display region can include a portion of the display that corresponds to (e.g., includes, is filled/occupied by, depicts, is or would be used to display, etc.) a portion of the primary content item that has an estimated saliency value that does not exceed (e.g., that is less than or equal to) a saliency threshold. The media device(s) 106 can determine saliency values (e.g., a saliency map with saliency values) corresponding to different portions of the primary content item using any saliency estimation techniques described herein, and can compare the saliency values to a predetermined threshold saliency value in order to identify a portion of the primary content item that has a saliency value that is less than or equal to the predetermined threshold saliency value. Once the content portion that has a saliency value that is less than or equal to a threshold saliency value is identified, the media device(s) 106 can identify a display region of the display device(s) 108 displaying that content portion, and can select that display region as an ROI for placing/displaying the secondary content item.

At step 608, the media device(s) 106 can display the secondary content item on a display defined in the display configuration. The media device(s) 106 can display the secondary content item according to any other settings or instructions specified in the display configuration. For example, the media device(s) 106 can instruct the computing device 320 to the display the secondary content item at the display 322 connected to the computing device 320. As another example, the media device(s) 106 can display the secondary content item at the display 324 or on a specific display region (e.g., an ROI) of the display device(s) 108. The media device(s) 106 can implement other presentation/configuration details such as a trigger for displaying the secondary content item (and/or stop displaying the secondary content item), settings specifying how to display the secondary content item, etc.

Figure 7:
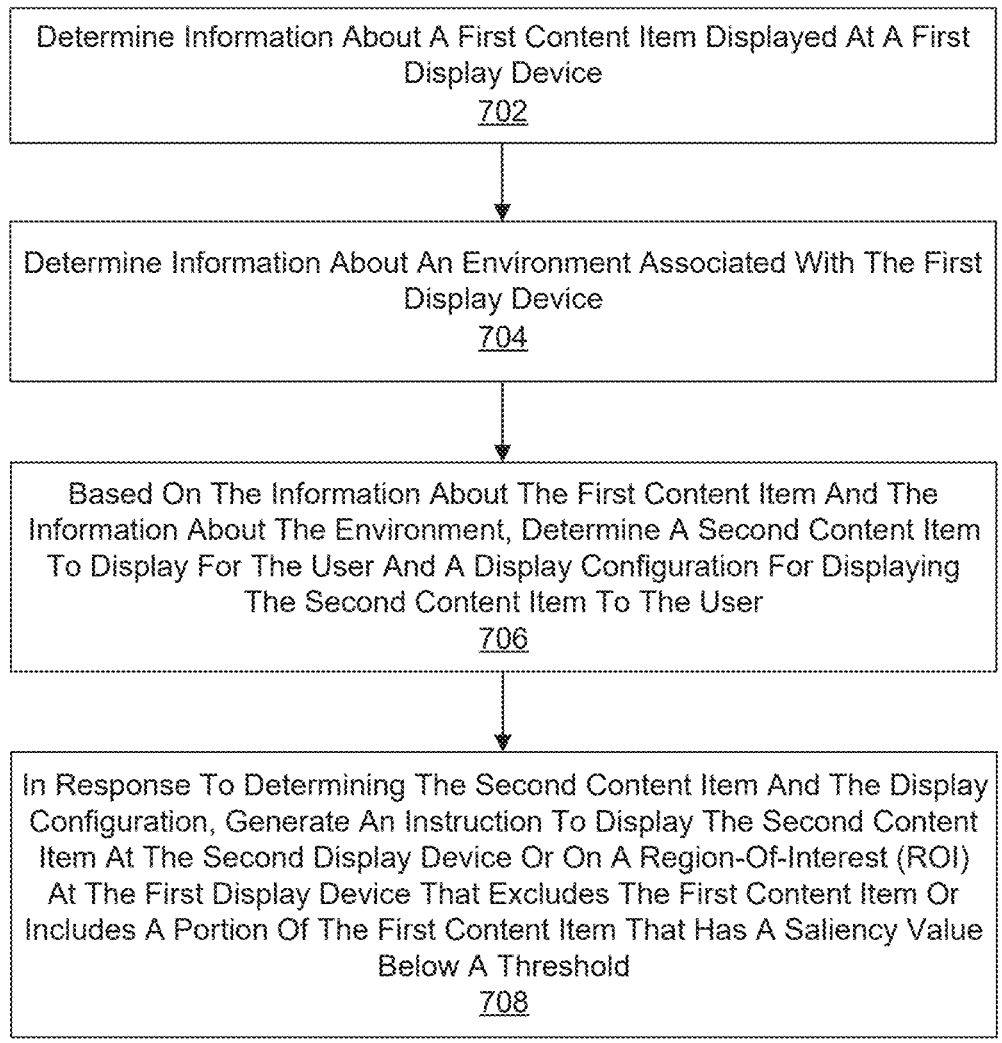

FIG. 7 is a flowchart illustrating an example method 700 for determining a configuration of secondary content for presentation to a user, according to some examples of the present disclosure. The method 700 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 700. Further, some of the steps may be performed simultaneously, or in a different order than shown in FIG. 7, as will be understood by a person of ordinary skill in the art. Method 700 shall be described with reference to FIGS. 3 and 4. However, method 700 is not limited to those examples.

At step 702, the content placement system 128 can determine information about a first content item (e.g., primary content) displayed at a first display device (e.g., display device(s) 108). The information about the first content item can include, for example and without limitation, a display configuration of the first content item, a characteristic(s) of the first content item, and/or any other information associated with the first content item. In some examples, the display configuration can include, define, and/or indicate where the first content item is displayed (e.g., which display device is displaying the first content item), a placement of the first content item within a display area (e.g., display region 404, display region 422, display region 444, etc.) of the display device used to display the first content item, a display resolution, rendering settings, a display mode (e.g., playback mode, trick mode or trick play, fast-forward mode, rewind mode, static mode, etc.), a display layout and/or layout settings, screen/display settings, a display scale, a video bitrate, color settings, a presentation mode (e.g., mirrored display, extended display, etc.), playback settings, a frame rate, a display size, an aspect ratio, and/or any other display configuration details or settings.

Moreover, the characteristic(s) of the first content item can include, for example and without limitation, a size (e.g., a display size of the first content item, a storage size of the first content item, an image or pixel height and/or width of the first content item, an aspect ratio of the first content item, etc.), a geometric shape of the first content item, a type of content of the first content item (e.g., a live video, a pre-recorded or on-demand video, an image, graphics, an animated video, a video game, a movie, a video clip, a TV show, etc.), a digital format of the first content item, a content category of the first content item, a language of an audio corresponding to the first content item, a genre of the first content item, visual effects associated with the first content item, a resolution of the first content item, a scale or scaling settings of the first content item, a framerate of the first content item, color settings of the first content item, a type of graphic(s) in the first content item, a video component(s) and/or asset(s) of the first content item, an audio component(s) and/or asset(s) of the first content item, a text component(s) and/or asset(s) of the first content item, encoding settings, a video frame size, a bit depth, a transparency, color channel information (e.g., R, G, B channels and/or values, etc.), an interpolation associated with the first content item, motion (or lack thereof) in the first content item, a duration or length, a rating, metadata, etc.

At step 704, the content placement system 128 can determine information about an environment (e.g., user environment 310) associated with the first display device. In some examples, the information about the environment can indicate whether a user (e.g., user(s) 132) is present in the environment. The presence of the user (or lack thereof) can be determined based on data collected from one or more sensors (e.g., image data from an image/camera sensor, etc.), a location of a mobile device associated with the user, an ISP of the user, a user profile, a Bluetooth tag associated with the user, a user input, and/or any other localization information.

In some cases, the information about the environment can additionally or alternatively indicate whether the environment includes a second display device (e.g., display 322 and/or display 324) that is communicatively coupled to a first client device (e.g., media device(s) 106) in the environment or a second client device (e.g., computing device 320) that is communicatively coupled to the first client device. For example, the information can indicate that the environment includes display 324, which is communicatively coupled to media device(s) 106 and/or is communicatively coupled to display 322, which is communicatively coupled to computing device 320 (which is communicatively coupled to media device(s) 106).

At step 706, the content placement system 128 can determine, based on the information about the first content item and the information about the environment, a second content item (e.g., secondary content) to display for the user and a second display configuration for displaying the second content item to the user. For example, the content placement system 128 can determine what content to display as the second content item, where to display the second content item (which display device, which display region on a display device, etc.), how to display the second content item, and/or any other display settings.

In some examples, the first content item can include an image(s) and/or a video frame(s) from a sequence of video frames. Moreover, the second content item can include closed captions generated from speech in the first content item, subtitles generated from speech in the first content item, a video, text, and/or image data. In some cases, the image data can depict a logo, a thumbnail, sign language generated based on speech in the first content item, and/or anything else.

At step 708, the content placement system 128 can generate, in response to determining the second content item and the second display configuration, an instruction to display the second content item at the second display device and/or on an ROI at the first display device. The ROI at the first display device can exclude the first content item or can include a portion of the first content item that has an estimated saliency value that is less than or equal to a threshold. In other words, the content placement system 128 can generate an instruction to display the second content item on a different display device than the first content item (e.g., the second display device) or within an ROI on the same display device (e.g., the first display device) as the first content item, where the ROI corresponds to a display region that does not include (e.g., does not depict, is not filled or occupied by, is not used to display any portion of) the first content item (e.g., so as to not block/obstruct or interfere with any portion of the first content item) or that includes a portion of the first content item that has a saliency value that is less than or equal to a threshold saliency value.

In some aspects, the information about the environment can include an indication that the environment includes a second display device. In some examples, the information about the environment can additionally include an indication that the second display device in the environment is available to display the second content item. In some aspects, the content placement system 128 can determine the second display configuration by selecting the second display device to display the second content item. The content placement system 128 can select the second display device for the second content item based on a determination that the first content item is displayed at the first display device and the indication that the environment includes the second display device and/or the indication that the second display device is available to display the second content item). In some examples, the instruction to display the second content item can be configured to cause the first client device to display the second content item at the second display device or instruct the second client device to display the second content item at the second display device.

In some aspects, the content placement system 128 can determine, based on a difference between an aspect ratio of the first content item and an aspect ratio of the first display device, that the first content item fits within a display region of the first display device that excludes the ROI. The content placement system 128 can also determine that the second content item fits within the ROI on the first display device.

In this example, the instruction to display the second content item can be configured to cause the first client device to display the second content item within the ROI on the first display device.

In some aspects, the content placement system 128 can determine, based on the difference between the aspect ratio of the first content item and the aspect ratio of the first display device, that the first content item does not entirely fit within a display area of the first display device which includes the ROI and one or more additional display regions. In response to determining that the first content item does not entirely fit within the display area of the first display device, the content placement system 128 can resize the first content item from a first size to a second size that fits within the one or more additional display regions of the first display device, and determine that the ROI on the first display device does not include the resized first content item and the second content item fits within the ROI on the first display device. Here, the instruction to display the second content item can be configured to cause the first client device to display the second content item within the ROI on the first display device.

In some aspects, the content placement system 128 can determine, based on the difference between the aspect ratio of the first content item and the aspect ratio of the first display device, that the first content item fits within an entire display area of the first display device, and resize the first content item from a first size to a second size that fits within a display region of the first display device that excludes the ROI. In other words, the content placement system 128 can resize the first content item so it fits within a subset of the display of the first display device where the subset excludes the ROI so the second content item can be displayed within the ROI while the first content item is displayed in the subset of the display of the first display device. In this example, the content placement system 128 can also determine that the ROI on the first display device does not include the resized first content item (e.g., that the ROI is not used or needed to display the resized first content item) and that the second content item fits within the ROI. Here, the instruction to display the second content item can be configured to cause the first client device to display the second content item within the ROI on the first display device (e.g., while the first content item is displayed on the subset of the display).

In some aspects, the content placement system 128 can determine user attention data indicating attention levels of the user with respect to display regions of the first display device. In this example, the display regions can correspond to one or more portions of the first content item. Based on the attention data, the content placement system 128 can determine that an attention level of the user with respect to a display region of the first display device is below a threshold or lower than a different attentional level of the user with respect to one or more additional display regions of the first display device. The content placement system 128 can then select the display region as the ROI for displaying the second content item based on the determination that the attention level of the user with respect to the display region is below the threshold or lower than the different attentional level of the user with respect to the one or more additional display regions.

In some cases, the content placement system 128 can determine saliency data corresponding to the first content item. The saliency data can include saliency values of different portions of the first content item. The content placement system 128 can then determine that a saliency value of a first portion of the first content item is lower than a different saliency value of one or more second portions of the first content item, and select the first portion from the different portions of the first content item as the ROI on the first display device. The ROI can be selected as a display location within the first display device for placing and displaying the second content item.

In some examples, the content placement system 128 can determine that a fast-forward or rewind operation has been initiated to fast-forward or rewind the first content item. The fast-forward or rewind operation can trigger the first display device to stop displaying the first content item within a display region of the first display device, and start displaying a visual fast-forward or rewind effect within a first portion of the display region. In response to detecting fast-forward or rewind operation associated with the first content item, the content placement system 128 can select a second portion of the display region as the ROI for displaying the second content item during the fast-forward or rewind operation associated with the first content item. Here, the instruction to display the second content item can be configured to cause the first client device to display, during the fast-forward or rewind operation, the second content item on the second portion of the display region selected as the ROI.

Example Neural Network Architectures

Figure 8:
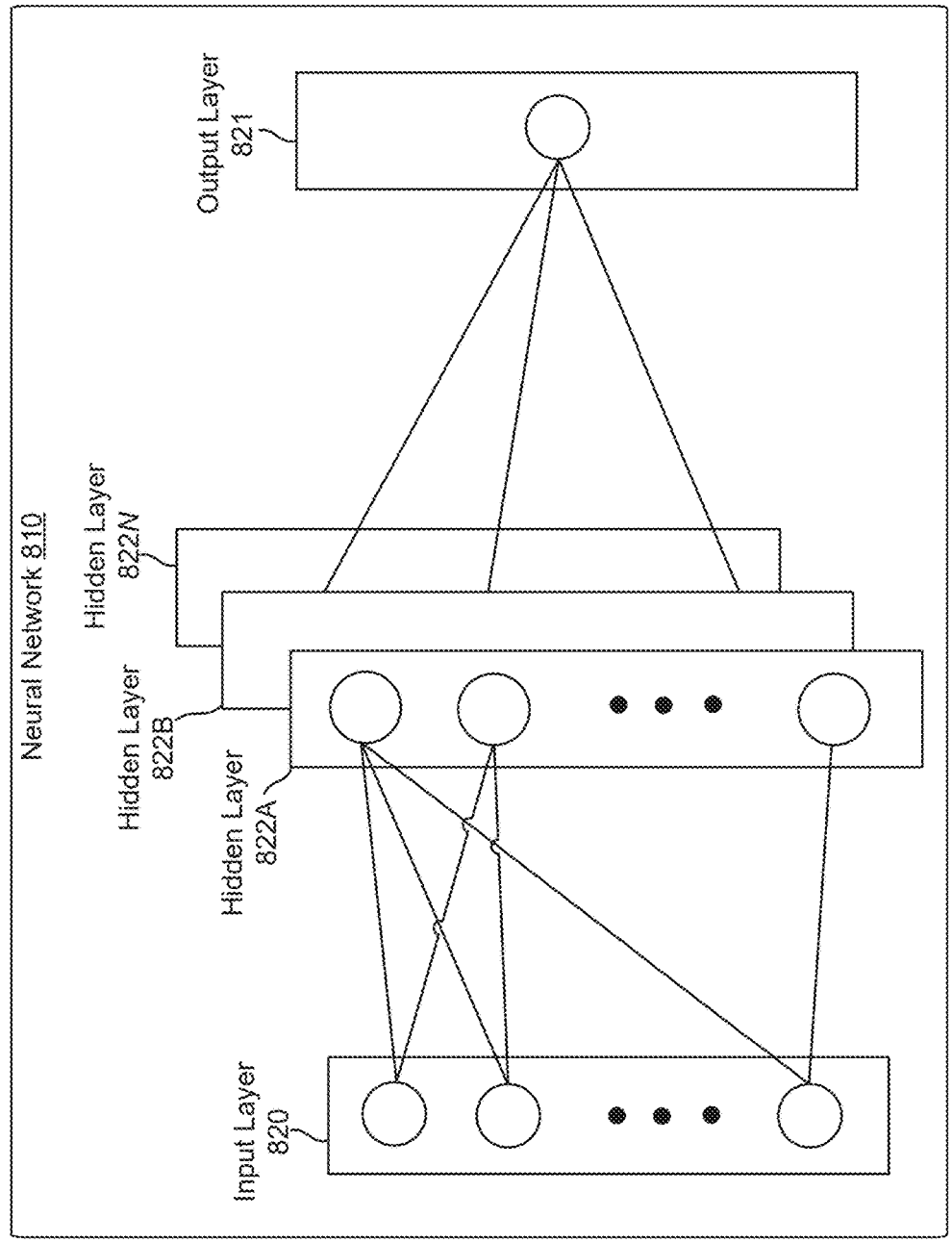
FIG. 8 is a diagram illustrating an example architecture of an example neural network, according to some examples of the present disclosure.

FIG. 8 is a diagram illustrating an example architecture 800 of an example neural network 810. The example architecture 800 can be used to implement any neural networks described herein. For example, the architecture 800 can be used to implement the content placement system 128 (or a portion thereof), a neural network for recognizing speech (e.g., from a primary content item) and generating text (e.g., transcriptions) from the speech, a neural network for translating speech into subtitles, a neural network for generating sign language depictions based on speech, a neural network for saliency estimation, a neural network for determining attention levels of a user, a neural network for facial recognition, and/or any other neural network.

The architecture 800 of the neural network 810 can include an input layer 820 that can be configured to receive and process data to generate one or more outputs. The architecture 800 of the neural network 810 can also include hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The architecture 800 of the neural network 810 can further include an output layer 821 that provides an output resulting from the processing performed by the hidden layers 822a, 822b, through 822n.

The neural network 810 is a multi-layer neural network of interconnected nodes. Each node can represent a piece of information. Information associated with the nodes is shared among the different layers and each layer retains information as information is processed. In some cases, the neural network 810 can include a feed-forward network, in which case there are no feedback connections where outputs of the network are fed back into itself. In some cases, the neural network 810 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network 810 are shown as having multiple output lines, a node can have a single output and all lines shown as being output from a node represent the same output value.

In some cases, each node or interconnection between nodes can have a weight that is a set of parameters derived from the training of the neural network 810. Once the neural network 810 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network 810 to be adaptive to inputs and able to learn as more and more data is processed.

The neural network 810 is pre-trained to process the features from the data in the input layer 820 using the different hidden layers 822a, 822b, through 822n in order to provide the output through the output layer 821.

In some cases, the neural network 810 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 810 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total = \Sigma(\frac{1}{2} (target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 810 can perform a backward pass by determining which inputs (weights) most contributed to the loss of the network and can adjust the weights so that the loss decreases and is eventually minimized.

The neural network 810 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 810 can include any other deep network other than a CNN, such as a transformer, an encoder-decoder network, an encoder-only network, a decoder-only network, a mixture of experts (MoE) network, a generative model network, an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Various aspects and examples may be implemented, for example, using one or more well-known computer systems, such as computer system 900 shown in FIG. 9. For example, the one or more media devices 106, the one or more content servers 120, the one or more system servers 126 (e.g., including the content placement system 128, the audio command processing system(s) 130, and/or any device or devices implementing the content placement system 128 and/or the audio command processing system(s) 130) may be implemented using combinations or sub-combinations of computer system 900. Also or alternatively, computer system 900 may be used, for example, to implement any of the aspects and examples discussed herein, as well as combinations and sub-combinations thereof.

Computer system 900 may include one or more processors (e.g., central processing units or CPUs), such as processor 904. Processor 904 may be connected to a communication infrastructure 906 (or communication bus).

Computer system 900 may also include user input/output device(s) 903, such as monitors, keyboards, pointing devices, etc., which may communicate with communication infrastructure 906 through user input/output interface(s) 902.

In some examples, the one or more processors 904 may include a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. In other examples, the one or more processors 904 may additionally or alternatively include or be part of a digital signal processor (DSP), an image signal processor (ISP), an application-specific integrated circuit (ASIC), a field-programmable gate array (FPGA), an integrated circuit, a microcontroller, and/or any other processing device.

Computer system 900 may also include a main or primary memory 908, such as random access memory (RAM). Main memory 908 may include one or more levels of cache. Main memory 908 may have stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may include a communication or network interface 924. Communication interface 924 may enable computer system 900 to communicate and interact with any combination of external devices, external networks, external entities, etc. (individually and collectively referenced by reference number 928). For example, communication interface 924 may allow computer system xx00 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, mobile phone (e.g., smartphone), smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Examples of the Disclosure Include:

Aspect 1. A system comprising: memory; and one or more processors coupled to the memory and configured to perform operations comprising: determining information about a first content item displayed at a first display device associated with the system, wherein the information about the first content item identifies at least one of a first display configuration and a characteristic of the first content item; determining information about an environment associated with the first display device, wherein the information about the environment indicates at least one of whether a user is present in the environment and whether the environment includes a second display device that is communicatively coupled to the system or that is communicatively coupled to a client device communicatively coupled to the system; based on the information about the first content item and the information about the environment, determining a second content item to display for the user and a second display configuration for displaying the second content item to the user; and in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

Aspect 2. The system of Aspect 1, wherein the information about the environment comprises an indication that the environment includes the second display device and that the second display device is available to display the second content item, and wherein determining the second display configuration comprises selecting the second display device to display the second content item based on a determination that the first content item is displayed at the first display device and the indication that the environment includes the second display device and that the second display device is available to display the second content item.

Aspect 3. The system of Aspect 2, wherein the instruction is configured to cause the system to display the second content item on the second display device or instruct the client device to display the second content item on the second display device.

Aspect 4. The system of any of Aspects 1 to 3, wherein the one or more processors are configured to perform operations further comprising: based on a difference between a first aspect ratio of the first content item and a second aspect ratio of the first display device, determining that the first content item fits within a display region at the first display device that excludes the ROI; and determining that the second content item fits within the ROI at the first display device, wherein the instruction is configured to cause the system to display the second content item within the ROI at the first display device.

Aspect 5. The system of any of Aspects 1 to 4, wherein the one or more processors are configured to perform operations further comprising: based on a difference between a first aspect ratio of the first content item and a second aspect ratio of the first display device, determining that the first content item does not entirely fit within a display area of the first display device, the display area comprising the ROI and one or more additional display regions; in response to determining that the first content item does not entirely fit within the display area of the first display device, resizing the first content item from a first size to a second size that fits within the one or more additional display regions; and determining that the ROI at the first display device excludes the resized first content item and that the second content item fits within the ROI at the first display device, wherein the instruction is configured to cause the system to display the second content item within the ROI at the first display device.

Aspect 6. The system of any of Aspects 1 to 5, wherein the one or more processors are configured to perform operations further comprising: based on a difference between a first aspect ratio of the first content item and a second aspect ratio of the first display device, determining that the first content item fits within an entire display area of the first display device, wherein the entire display area comprises the ROI and one or more additional display regions that exclude the ROI; resizing the first content item from a first size to a second size that fits within the one or more display regions; and determining that the ROI at the first display device does not include the resized first content item and that the second content item fits within the ROI at the first display device, wherein the instruction is configured to cause the system to display the second content item within the ROI at the first display device.

Aspect 7. The system of any of Aspects 1 to 6, wherein the one or more processors are configured to perform operations further comprising: determining user attention data indicating attention levels of the user with respect to a display region at the first display device used to display a portion of the first content item; based on the attention data, determining that an attention level of the user with respect to the display region at the first display device is below a threshold or is lower than a different attention level of the user with respect to one or more additional display regions at the first display device, the one or more additional display regions excluding the display region; and selecting the display region at the first display device as the ROI based on the determining that the attention level of the user with respect to the display region is below the threshold or is lower than the different attention level of the user with respect to the one or more additional display regions.

Aspect 8. The system of any of Aspects 1 to 7, wherein the one or more processors are configured to perform operations further comprising: determining saliency data corresponding to the first content item, the saliency data comprising saliency values of different portions of the first content item; determining that a saliency value of a first portion from the different portions of the first content item is below a threshold or is lower than a different saliency value of a second portion from the different portions of the first content item; and selecting, as the ROI at the first display device, a display region used to display the first portion of the first content item.

Aspect 9. The system of any of Aspects 1 to 8, wherein the one or more processors are configured to perform operations further comprising: determining that a fast-forward or rewind operation has been initiated to fast-forward or rewind the first content item, wherein the fast-forward or rewind operation triggers the first display device to stop displaying the first content item within a display region of the first display device and start displaying a visual fast-forward or rewind effect within a first portion of the display region; and in response to determining that the fast-forward or rewind operation associated with the first content item has been initiated, selecting a second portion of the display region as the ROI for displaying the second content item during the fast-forward or rewind operation associated with the first content item, wherein the instruction is configured to cause the system to display, during the fast-forward or rewind operation, the second content item on the second portion of the display region selected as the ROI.

Aspect 10. The system of any of Aspects 1 to 9, wherein the first content item comprises at least one of an image and one or more video frames from a sequence of video frames, and wherein the second content item comprises at least one of closed captions generated from speech corresponding to the first content item, subtitles generated from the speech corresponding to the first content item, a video, text, and image data depicting at least one of a logo, a thumbnail, and sign language generated based on the speech corresponding to the first content item.

Aspect 11. A computer-implemented method comprising: determining information about a first content item displayed at a first display device, wherein the information about the first content item identifies at least one of a first display configuration and a characteristic of the first content item; determining information about an environment associated with the first display device, the information about the environment indicating at least one of whether a user is present in the environment and whether the environment includes a second display device that is communicatively coupled to a first client device associated with the first display device or that is communicatively coupled to a second client device communicatively coupled to the first client device; based on the information about the first content item and the information about the environment, determining a second content item to display for the user and a second display configuration for displaying the second content item to the user; and in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

Aspect 12. The computer-implemented method of Aspect 11, wherein the information about the environment comprises an indication that the environment includes the second display device, and wherein determining the second display configuration comprises selecting the second display device to display the second content item based on a determination that the first content item is displayed at the first display device and the indication that the environment includes the second display device.

Aspect 13. The computer-implemented method of Aspect 12, wherein the instruction is configured to cause the first client device to display the second content item at the second display device or instruct the second client device to display the second content item at the second display device.

Aspect 14. The computer-implemented method of any of Aspects 11 to 13, further comprising: based on a difference between a first aspect ratio of the first content item and a second aspect ratio of the first display device, determining that the first content item fits within a display region of the first display device that excludes the ROI; and determining that the second content item fits within the ROI at the first display device, wherein the instruction is configured to cause the first client device to display the second content item within the ROI at the first display device.

Aspect 15. The computer-implemented method of any of Aspects 11 to 14, further comprising: based on a difference between a first aspect ratio of the first content item and a second aspect ratio of the first display device, determining that the first content item does not entirely fit within a display area of the first display device, the display area comprising the ROI and one or more additional display regions; in response to determining that the first content item does not entirely fit within the display area of the first display device, resizing the first content item from a first size to a second size that fits within the one or more additional display regions of the first display device; and determining that the ROI at the first display device does not include the resized first content item and that the second content item fits within the ROI at the first display device, wherein the instruction is configured to cause the first client device to display the second content item within the ROI at the first display device.

Aspect 16. The computer-implemented method of any of Aspects 11 to 15, further comprising: based on a difference between a first aspect ratio of the first content item and a second aspect ratio of the first display device, determining that the first content item fits within an entire display area of the first display device, the entire display area comprising the ROI and one or more additional display regions that exclude the ROI; resizing the first content item from a first size to a second size that fits within the one or more display regions associated with the entire display area of the first display device; and determining that the ROI at the first display device excludes the resized first content item and the second content item fits within the ROI, wherein the instruction is configured to cause the first client device to display the second content item within the ROI at the first display device.

Aspect 17. The computer-implemented method of any of Aspects 11 to 16, further comprising: determining user attention data indicating attention levels of the user with respect to a display region used to display one or more portions of the first content item at the first display device; based on the attention data, determining that an attention level of the user with respect to the display region is below a threshold or is lower than a different attention level of the user with respect to one or more additional display regions at the first display device, the one or more additional display regions excluding the display region; and selecting the display region as the ROI based on the determining that the attention level of the user with respect to the display region is below the threshold or is lower than the different attention level of the user with respect to the one or more additional display regions at the first display device.

Aspect 18. The computer-implemented method of any of Aspects 11 to 17, further comprising: determining saliency data corresponding to the first content item, the saliency data comprising saliency values of different portions of the first content item; determining that a saliency value of a first portion from the different portions of the first content item is below a threshold or is lower than a different saliency value of a second portion from the different portions of the first content item; and selecting, as the ROI at the first display device, a display region used to display the first portion from the different portions of the first content item.

Aspect 19. The computer-implemented method of any of Aspects 11 to 18, further comprising: determining that a fast-forward or rewind operation has been initiated to fast-forward or rewind the first content item, wherein the fast-forward or rewind operation triggers the first display device to stop displaying the first content item within a display region of the first display device and start displaying a visual fast-forward or rewind effect within a first portion of the display region; and in response to determining that the fast-forward or rewind operation has been initiated, selecting a second portion of the display region as the ROI for displaying the second content item during the fast-forward or rewind operation associated with the first content item, wherein the instruction is configured to cause the first client device to display, during the fast-forward or rewind operation, the second content item on the second portion of the display region selected as the ROI.

Aspect 20. The computer-implemented method of any of Aspects 11 to 19, wherein the first content item comprises at least one of an image and one or more video frames from a sequence of video frames.

Aspect 21. The computer-implemented method of any of Aspects 11 to 20, wherein the second content item comprises at least one of closed captions generated from speech corresponding to the first content item, subtitles generated from the speech corresponding to the first content item, a video, text, and image data.

Aspect 22. The computer-implemented method of Aspect 21, wherein the image data depicts at least one of a logo, a thumbnail, and sign language generated based on the speech corresponding to the first content item.

Aspect 23. A non-transitory computer-readable medium having instructions stored thereon that, when executed by one or more processors, cause the one or more processors to perform operations comprising: determining information about a first content item displayed at a first display device, wherein the information about the first content item identifies at least one of a first display configuration and a characteristic of the first content item; determining information about an environment associated with the first display device, wherein the information about the environment indicates at least one of whether a user is present in the environment and whether the environment includes a second display device that is communicatively coupled to a first client device associated with the first display device or that is communicatively coupled to a second client device communicatively coupled to the first client device; based on the information about the first content item and the information about the environment, determining a second content item to display for the user and a second display configuration for displaying the second content item to the user; and in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

Aspect 24. A system comprising means for performing a method according to any of Aspects 11 to 22.

Aspect 25. A computer-program product comprising means for performing a method according to any of Aspects 11 to 22.

What is claimed is:

1. A system comprising:
   memory; and
   one or more processors coupled to the memory and configured to perform operations comprising:
      determining information about a first content item displayed at a first display device associated with the system, wherein the information about the first content item identifies at least one of a first display configuration and a characteristic of the first content item;
      determining information about an environment associated with the first display device, wherein the information about the environment indicates at least one of whether a user is present in the environment and whether the environment includes a second display device that is communicatively coupled to the system or that is communicatively coupled to a client device communicatively coupled to the system;
      based on the information about the first content item and the information about the environment, determining a second content item to display for the user and a second display configuration for displaying the second content item to the user; and
      in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

2. The system of claim 1, wherein the information about the environment comprises an indication that the environment includes the second display device and that the second display device is available to display the second content item, and wherein determining the second display configuration comprises selecting the second display device to display the second content item based on a determination that the first content item is displayed at the first display device and the indication that the environment includes the second display device and that the second display device is available to display the second content item.

3. The system of claim 2, wherein the instruction is configured to cause the system to display the second content item on the second display device or instruct the client device to display the second content item on the second display device.

4. The system of claim 1, wherein the one or more processors are configured to perform operations further comprising:
- based on a difference between a first aspect ratio of the first content item and a second aspect ratio of the first display device, determining that the first content item fits within a display region at the first display device that excludes the ROI; and
- determining that the second content item fits within the ROI at the first display device, wherein the instruction is configured to cause the system to display the second content item within the ROI at the first display device.

5. The system of claim 1, wherein the one or more processors are configured to perform operations further comprising:
- based on a difference between a first aspect ratio of the first content item and a second aspect ratio of the first display device, determining that the first content item does not entirely fit within a display area of the first display device, the display area comprising the ROI and one or more additional display regions;
- in response to determining that the first content item does not entirely fit within the display area of the first display device, resizing the first content item from a first size to a second size that fits within the one or more additional display regions; and
- determining that the ROI at the first display device excludes the resized first content item and that the second content item fits within the ROI at the first display device, wherein the instruction is configured to cause the system to display the second content item within the ROI at the first display device.

6. The system of claim 1, wherein the one or more processors are configured to perform operations further comprising:
- based on a difference between a first aspect ratio of the first content item and a second aspect ratio of the first display device, determining that the first content item fits within an entire display area of the first display device, wherein the entire display area comprises the ROI and one or more additional display regions that exclude the ROI;
- resizing the first content item from a first size to a second size that fits within the one or more display regions; and
- determining that the ROI at the first display device does not include the resized first content item and that the second content item fits within the ROI at the first display device, wherein the instruction is configured to cause the system to display the second content item within the ROI at the first display device.

7. The system of claim 1, wherein the one or more processors are configured to perform operations further comprising:
- determining user attention data indicating attention levels of the user with respect to a display region at the first display device used to display a portion of the first content item;
- based on the attention data, determining that an attention level of the user with respect to the display region at the first display device is below a threshold or is lower than a different attention level of the user with respect to one or more additional display regions at the first display device, the one or more additional display regions excluding the display region; and
- selecting the display region at the first display device as the ROI based on the determining that the attention level of the user with respect to the display region is below the threshold or is lower than the different attention level of the user with respect to the one or more additional display regions.

8. The system of claim 1, wherein the one or more processors are configured to perform operations further comprising:
- determining saliency data corresponding to the first content item, the saliency data comprising saliency values of different portions of the first content item;
- determining that a saliency value of a first portion from the different portions of the first content item is below a threshold or is lower than a different saliency value of a second portion from the different portions of the first content item; and
- selecting, as the ROI at the first display device, a display region used to display the first portion of the first content item.

9. The system of claim 1, wherein the one or more processors are configured to perform operations further comprising:
- determining that a fast-forward or rewind operation has been initiated to fast-forward or rewind the first content item, wherein the fast-forward or rewind operation triggers the first display device to stop displaying the first content item within a display region of the first display device and start displaying a visual fast-forward or rewind effect within a first portion of the display region; and
- in response to determining that the fast-forward or rewind operation associated with the first content item has been initiated, selecting a second portion of the display region as the ROI for displaying the second content item during the fast-forward or rewind operation associated with the first content item, wherein the instruction is configured to cause the system to display, during the fast-forward or rewind operation, the second content item on the second portion of the display region selected as the ROI.

10. The system of claim 1, wherein the first content item comprises at least one of an image and one or more video frames from a sequence of video frames, and wherein the second content item comprises at least one of closed captions generated from speech corresponding to the first content item, subtitles generated from the speech corresponding to the first content item, a video, text, and image data depicting at least one of a logo, a thumbnail, and sign language generated based on the speech corresponding to the first content item.

11. A computer-implemented method comprising:
- determining information about a first content item displayed at a first display device, wherein the information about the first content item identifies at least one of a first display configuration and a characteristic of the first content item;
- determining information about an environment associated with the first display device, the information about the environment indicating at least one of whether a user is present in the environment and whether the environment includes a second display device that is communicatively coupled to a first client device associated with the first display device or that is communicatively coupled to a second client device communicatively coupled to the first client device;
- based on the information about the first content item and the information about the environment, determining a second content item to display for the user and a second display configuration for displaying the second content item to the user; and in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

12. The computer-implemented method of claim 11, wherein the information about the environment comprises an indication that the environment includes the second display device, and wherein determining the second display configuration comprises selecting the second display device to display the second content item based on a determination that the first content item is displayed at the first display device and the indication that the environment includes the second display device.

13. The computer-implemented method of claim 12, wherein the instruction is configured to cause the first client device to display the second content item at the second display device or instruct the second client device to display the second content item at the second display device.

14. The computer-implemented method of claim 11, further comprising:

based on a difference between a first aspect ratio of the first content item and a second aspect ratio of the first display device, determining that the first content item fits within a display region of the first display device that excludes the ROI; and determining that the second content item fits within the ROI at the first display device, wherein the instruction is configured to cause the first client device to display the second content item within the ROI at the first display device.

15. The computer-implemented method of claim 11, further comprising:

based on a difference between a first aspect ratio of the first content item and a second aspect ratio of the first display device, determining that the first content item does not entirely fit within a display area of the first display device, the display area comprising the ROI and one or more additional display regions;

in response to determining that the first content item does not entirely fit within the display area of the first display device, resizing the first content item from a first size to a second size that fits within the one or more additional display regions of the first display device; and determining that the ROI at the first display device does not include the resized first content item and that the second content item fits within the ROI at the first display device, wherein the instruction is configured to cause the first client device to display the second content item within the ROI at the first display device.

16. The computer-implemented method of claim 11, further comprising:

based on a difference between a first aspect ratio of the first content item and a second aspect ratio of the first display device, determining that the first content item fits within an entire display area of the first display device, the entire display area comprising the ROI and one or more additional display regions that exclude the ROI;

resizing the first content item from a first size to a second size that fits within the one or more display regions associated with the entire display area of the first display device; and determining that the ROI at the first display device excludes the resized first content item and the second content item fits within the ROI, wherein the instruction is configured to cause the first client device to display the second content item within the ROI at the first display device.

17. The computer-implemented method of claim 11, further comprising:

determining user attention data indicating attention levels of the user with respect to a display region used to display one or more portions of the first content item at the first display device;

based on the attention data, determining that an attention level of the user with respect to the display region is below a threshold or is lower than a different attention level of the user with respect to one or more additional display regions at the first display device, the one or more additional display regions excluding the display region; and selecting the display region as the ROI based on the determining that the attention level of the user with respect to the display region is below the threshold or is lower than the different attention level of the user with respect to the one or more additional display regions at the first display device.

18. The computer-implemented method of claim 11, further comprising:

determining saliency data corresponding to the first content item, the saliency data comprising saliency values of different portions of the first content item;

determining that a saliency value of a first portion from the different portions of the first content item is below a threshold or is lower than a different saliency value of a second portion from the different portions of the first content item; and selecting, as the ROI at the first display device, a display region used to display the first portion from the different portions of the first content item.

19. The computer-implemented method of claim 11, further comprising:

determining that a fast-forward or rewind operation has been initiated to fast-forward or rewind the first content item, wherein the fast-forward or rewind operation triggers the first display device to stop displaying the first content item within a display region of the first display device and start displaying a visual fast-forward or rewind effect within a first portion of the display region; and in response to determining that the fast-forward or rewind operation has been initiated, selecting a second portion of the display region as the ROI for displaying the second content item during the fast-forward or rewind operation associated with the first content item, wherein the instruction is configured to cause the first client device to display, during the fast-forward or rewind operation, the second content item on the second portion of the display region selected as the ROI.

20. A non-transitory computer-readable medium having instructions stored thereon that, when executed by one or more processors, cause the one or more processors to perform operations comprising:

determining information about a first content item displayed at a first display device, wherein the information about the first content item identifies at least one of a first display configuration and a characteristic of the first content item;

determining information about an environment associated with the first display device, wherein the information about the environment indicates at least one of whether a user is present in the environment and whether the environment includes a second display device that is communicatively coupled to a first client device associated with the first display device or that is communicatively coupled to a second client device communicatively coupled to the first client device;

based on the information about the first content item and the information about the environment, determining a second content item to display for the user and a second display configuration for displaying the second content item to the user; and in response to determining the second content item and the second display configuration, generating an instruction to display the second content item at the second display device or on a region-of-interest (ROI) at the first display device, wherein the ROI at the first display device excludes the first content item or includes a portion of the first content item that has an estimated saliency value that is below a threshold.

* * * * *